US012440227B2

(12) United States Patent
Luna et al.

(10) Patent No.: US 12,440,227 B2
(45) Date of Patent: Oct. 14, 2025

(54) PREPARING A TIBIA FOR RECEIVING TIBIAL IMPLANT COMPONENT OF A REPLACEMENT ANKLE

(71) Applicant: WRIGHT MEDICAL TECHNOLOGY, INC., Memphis, TN (US)

(72) Inventors: Ramon Luna, Arlington, TN (US); Kian-Ming Wong, Lakeland, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 169 days.

(21) Appl. No.: 18/252,547

(22) PCT Filed: Jan. 5, 2022

(86) PCT No.: PCT/US2022/011256
§ 371 (c)(1),
(2) Date: May 11, 2023

(87) PCT Pub. No.: WO2022/182430
PCT Pub. Date: Sep. 1, 2022

(65) Prior Publication Data
US 2024/0016504 A1 Jan. 18, 2024

Related U.S. Application Data

(60) Provisional application No. 63/152,996, filed on Feb. 24, 2021.

(51) Int. Cl.
*A61B 17/16* (2006.01)
*A61B 17/17* (2006.01)

(52) U.S. Cl.
CPC ...... *A61B 17/1682* (2013.01); *A61B 17/1631* (2013.01); *A61B 17/164* (2013.01); *A61B 17/1775* (2016.11)

(58) Field of Classification Search
CPC ............ A61B 17/1682; A61B 17/1775; A61B 17/1675; A61B 17/164
See application file for complete search history.

(56) References Cited

U.S. PATENT DOCUMENTS

| 3,314,420 A | 4/1967 | Smith et al. |
| 3,605,123 A | 9/1971 | Hahn |

(Continued)

FOREIGN PATENT DOCUMENTS

| CA | 2836651 C | 3/2016 |
| CN | 1662186 | 8/2005 |

(Continued)

OTHER PUBLICATIONS

DePuy Synthes, "Flexible Reamers for Intramedullary Nails" Surgical Technique, 22 pages, 2017.

(Continued)

*Primary Examiner* — Amy R Sipp
(74) *Attorney, Agent, or Firm* — DUANE MORRIS LLP

(57) ABSTRACT

Disclosed is a method of preparing a tibial intramedullary canal for receiving a tibial implant such as a stem component of a total ankle replacement prosthesis where an extended cavity is prepared in the tibial intramedullary canal by pulling a tibial reamer bit in the proximal direction from the distal end of a tibia into the tibial intramedullary canal by using a flexible neck tooling introduced through the tibial intramedullary canal from a position proximal to the distal end of the tibia.

14 Claims, 14 Drawing Sheets

Anterior View

(56) References Cited

U.S. PATENT DOCUMENTS

| | | |
|---|---|---|
| 3,798,679 A | 3/1974 | Ewald |
| 3,808,606 A | 5/1974 | Tronzo |
| 3,843,975 A | 10/1974 | Tronzo |
| 3,855,638 A | 12/1974 | Pilliar |
| 3,938,198 A | 2/1976 | Kahn et al. |
| 3,987,499 A | 10/1976 | Scharbach et al. |
| 4,052,753 A | 10/1977 | Dedo |
| 4,055,862 A | 11/1977 | Farling |
| 4,085,466 A | 4/1978 | Goodfellow et al. |
| 4,098,626 A | 7/1978 | Graham et al. |
| 4,203,444 A | 5/1980 | Bonnell et al. |
| 4,213,816 A | 7/1980 | Morris |
| 4,340,978 A | 7/1982 | Buechel et al. |
| 4,368,040 A | 1/1983 | Weissman |
| 4,436,684 A | 3/1984 | White |
| 4,501,266 A | 2/1985 | McDaniel |
| 4,502,161 A | 3/1985 | Wall |
| 4,586,496 A | 5/1986 | Keller |
| 4,594,380 A | 6/1986 | Chapin et al. |
| 4,601,290 A | 7/1986 | Effron et al. |
| 4,609,551 A | 9/1986 | Caplan et al. |
| 4,627,853 A | 12/1986 | Campbell et al. |
| 4,703,751 A | 11/1987 | Pohl |
| 4,704,686 A | 11/1987 | Aldinger |
| 4,715,860 A | 12/1987 | Amstutz et al. |
| 4,721,104 A | 1/1988 | Kaufman et al. |
| 4,759,350 A | 7/1988 | Dunn et al. |
| 4,769,040 A | 9/1988 | Wevers |
| 4,841,975 A | 6/1989 | Woolson |
| 4,846,835 A | 7/1989 | Grande |
| 4,865,607 A | 9/1989 | Witzel et al. |
| 4,880,429 A | 11/1989 | Stone |
| 4,936,862 A | 6/1990 | Walker et al. |
| 4,979,949 A | 12/1990 | Matsen, III et al. |
| 5,002,547 A | 3/1991 | Poggie |
| 5,041,138 A | 8/1991 | Vacanti et al. |
| 5,059,216 A | 10/1991 | Winters |
| 5,067,964 A | 11/1991 | Richmond et al. |
| 5,122,144 A | 6/1992 | Bert et al. |
| 5,129,908 A | 7/1992 | Petersen |
| 5,133,759 A | 7/1992 | Turner |
| 5,154,717 A | 10/1992 | Matsen, III et al. |
| 5,162,430 A | 11/1992 | Rhee et al. |
| 5,171,322 A | 12/1992 | Kenny |
| 5,197,985 A | 3/1993 | Caplan et al. |
| 5,206,023 A | 4/1993 | Hunziker |
| 5,226,914 A | 7/1993 | Caplan et al. |
| 5,234,433 A | 8/1993 | Bert et al. |
| 5,250,050 A | 10/1993 | Poggie et al. |
| 5,258,032 A | 11/1993 | Bertin |
| 5,270,300 A | 12/1993 | Hunziker |
| 5,288,797 A | 2/1994 | Khalil et al. |
| 5,303,148 A | 4/1994 | Mattson et al. |
| 5,306,311 A | 4/1994 | Stone et al. |
| 5,314,482 A | 5/1994 | Goodfellow et al. |
| 5,344,459 A | 9/1994 | Swartz |
| 5,360,446 A | 11/1994 | Kennedy |
| 5,365,996 A | 11/1994 | Crook |
| 5,368,858 A | 11/1994 | Hunziker |
| 5,370,692 A | 12/1994 | Fink et al. |
| 5,380,332 A | 1/1995 | Ferrante |
| 5,387,216 A | 2/1995 | Thornhill et al. |
| 5,454,816 A | 10/1995 | Ashby |
| 5,462,550 A | 10/1995 | Dietz et al. |
| 5,468,787 A | 11/1995 | Braden et al. |
| 5,474,559 A | 12/1995 | Bertin et al. |
| 5,478,739 A | 12/1995 | Slivka et al. |
| 5,486,180 A | 1/1996 | Dietz et al. |
| 5,501,687 A | 3/1996 | Willert et al. |
| 5,503,162 A | 4/1996 | Athanasiou et al. |
| 5,520,695 A | 5/1996 | Luckman |
| 5,523,843 A | 6/1996 | Yamane et al. |
| 5,540,696 A | 7/1996 | Booth, Jr. et al. |
| 5,542,947 A | 8/1996 | Treacy |
| 5,554,190 A | 9/1996 | Draenert |
| 5,556,432 A | 9/1996 | Kubein-Meesenburg et al. |
| 5,571,205 A | 11/1996 | James |
| 5,575,793 A | 11/1996 | Carls et al. |
| 5,578,037 A | 11/1996 | Sanders et al. |
| 5,593,450 A | 1/1997 | Scott et al. |
| 5,597,379 A | 1/1997 | Haines et al. |
| 5,601,563 A | 2/1997 | Burke et al. |
| 5,613,970 A | 3/1997 | Houston et al. |
| 5,616,146 A | 4/1997 | Murray |
| 5,630,820 A | 5/1997 | Todd |
| 5,632,745 A | 5/1997 | Schwartz |
| 5,649,929 A | 7/1997 | Callaway |
| 5,658,290 A | 8/1997 | Techeira |
| 5,671,741 A | 9/1997 | Lang et al. |
| 5,682,886 A | 11/1997 | Delp et al. |
| 5,683,466 A | 11/1997 | Vitale |
| 5,684,562 A | 11/1997 | Fujieda |
| 5,688,282 A | 11/1997 | Baron et al. |
| 5,728,162 A | 3/1998 | Eckhoff |
| 5,735,277 A | 4/1998 | Schuster |
| 5,749,874 A | 5/1998 | Schwartz |
| 5,749,876 A | 5/1998 | Duvillier et al. |
| 5,765,561 A | 6/1998 | Chen et al. |
| 5,768,134 A | 6/1998 | Swaelens et al. |
| 5,769,899 A | 6/1998 | Schwartz et al. |
| 5,786,217 A | 7/1998 | Tuba et al. |
| 5,798,924 A | 8/1998 | Eufinger et al. |
| 5,800,438 A | 9/1998 | Tuke et al. |
| 5,824,083 A | 10/1998 | Draenert |
| 5,827,289 A | 10/1998 | Reiley et al. |
| 5,830,216 A | 11/1998 | Insall et al. |
| 5,835,619 A | 11/1998 | Morimoto et al. |
| 5,842,477 A | 12/1998 | Naughton et al. |
| 5,847,804 A | 12/1998 | Sarver et al. |
| 5,853,746 A | 12/1998 | Hunziker |
| 5,860,981 A | 1/1999 | Bertin et al. |
| 5,871,018 A | 2/1999 | Delp et al. |
| 5,871,542 A | 2/1999 | Goodfellow et al. |
| 5,871,546 A | 2/1999 | Colleran et al. |
| 5,879,390 A | 3/1999 | Kubein-Meesenburg et al. |
| 5,880,976 A | 3/1999 | DiGioia, III et al. |
| 5,885,296 A | 3/1999 | Masini |
| 5,885,297 A | 3/1999 | Matsen, III |
| 5,885,298 A | 3/1999 | Herrington et al. |
| 5,897,559 A | 4/1999 | Masini |
| 5,899,859 A | 5/1999 | Votruba et al. |
| 5,900,245 A | 5/1999 | Sawhney et al. |
| 5,906,934 A | 5/1999 | Grande et al. |
| 5,911,723 A | 6/1999 | Ashby et al. |
| 5,916,220 A | 6/1999 | Masini |
| 5,939,323 A | 8/1999 | Valentini et al. |
| 5,951,475 A | 9/1999 | Gueziec et al. |
| 5,961,523 A | 10/1999 | Masini |
| 5,968,051 A | 10/1999 | Luckman et al. |
| 5,972,385 A | 10/1999 | Liu et al. |
| 5,995,738 A | 11/1999 | DiGioia, III et al. |
| 6,001,895 A | 12/1999 | Harvey et al. |
| 6,002,859 A | 12/1999 | DiGioia, III et al. |
| 6,006,126 A | 12/1999 | Cosman |
| 6,007,537 A | 12/1999 | Burkinshaw et al. |
| 6,010,509 A | 1/2000 | Delgado et al. |
| 6,013,081 A | 1/2000 | Burkinshaw et al. |
| 6,013,103 A | 1/2000 | Kaufman et al. |
| 6,046,379 A | 4/2000 | Stone et al. |
| 6,056,754 A | 5/2000 | Haines et al. |
| 6,056,756 A | 5/2000 | Eng et al. |
| 6,057,927 A | 5/2000 | Levesque et al. |
| 6,077,270 A | 6/2000 | Katz |
| 6,082,364 A | 7/2000 | Balian et al. |
| 6,090,144 A | 7/2000 | Letot et al. |
| 6,093,204 A | 7/2000 | Stone |
| 6,096,043 A | 8/2000 | Techiera et al. |
| 6,102,916 A | 8/2000 | Masini |
| 6,106,529 A | 8/2000 | Techiera |
| 6,110,209 A | 8/2000 | Stone |
| 6,120,541 A | 9/2000 | Johnson |
| 6,126,690 A | 10/2000 | Ateshian et al. |
| 6,139,578 A | 10/2000 | Lee et al. |
| 6,156,069 A | 12/2000 | Amstutz |

(56) References Cited

U.S. PATENT DOCUMENTS

| | | |
|---|---|---|
| 6,161,080 A | 12/2000 | Aouni-Ateshian et al. |
| 6,187,010 B1 | 2/2001 | Masini |
| 6,200,606 B1 | 3/2001 | Peterson et al. |
| 6,203,546 B1 | 3/2001 | MacMahon |
| 6,203,576 B1 | 3/2001 | Afriat et al. |
| 6,205,411 B1 | 3/2001 | DiGioia, III et al. |
| 6,206,927 B1 | 3/2001 | Fell et al. |
| 6,214,369 B1 | 4/2001 | Grande et al. |
| 6,217,894 B1 | 4/2001 | Sawhney et al. |
| 6,219,571 B1 | 4/2001 | Hargreaves et al. |
| 6,224,632 B1 | 5/2001 | Pappas et al. |
| 6,235,060 B1 | 5/2001 | Kubein-Meesenburg et al. |
| 6,251,143 B1 | 6/2001 | Schwartz et al. |
| 6,254,639 B1 | 7/2001 | Peckitt |
| 6,277,151 B1 | 8/2001 | Lee et al. |
| 6,281,195 B1 | 8/2001 | Rueger et al. |
| 6,283,980 B1 | 9/2001 | Vibe-Hansen et al. |
| 6,296,646 B1 | 10/2001 | Williamson |
| 6,299,905 B1 | 10/2001 | Peterson et al. |
| 6,322,588 B1 | 11/2001 | Ogle et al. |
| 6,327,491 B1 | 12/2001 | Franklin et al. |
| 6,328,765 B1 | 12/2001 | Hardwick et al. |
| 6,344,043 B1 | 2/2002 | Pappas |
| 6,344,059 B1 | 2/2002 | Krakovits et al. |
| 6,352,558 B1 | 3/2002 | Spector |
| 6,358,253 B1 | 3/2002 | Torrie et al. |
| 6,365,405 B1 | 4/2002 | Salzmann et al. |
| 6,371,958 B1 | 4/2002 | Overaker |
| 6,373,250 B1 | 4/2002 | Tsoref et al. |
| 6,375,658 B1 | 4/2002 | Hangody et al. |
| 6,379,367 B1 | 4/2002 | Vibe-Hansen et al. |
| 6,382,028 B1 | 5/2002 | Wooh et al. |
| 6,383,228 B1 | 5/2002 | Schmotzer |
| 6,387,131 B1 | 5/2002 | Miehlke et al. |
| 6,429,013 B1 | 8/2002 | Halvorsen et al. |
| 6,443,988 B2 | 9/2002 | Felt et al. |
| 6,443,991 B1 | 9/2002 | Running |
| 6,444,222 B1 | 9/2002 | Asculai et al. |
| 6,459,927 B1 | 10/2002 | Franklin et al. |
| 6,459,948 B1 | 10/2002 | Ateshian et al. |
| 6,468,314 B2 | 10/2002 | Schwartz et al. |
| 6,478,799 B1 | 11/2002 | Williamson |
| 6,479,996 B1 | 11/2002 | Hoogeveen et al. |
| 6,510,334 B1 | 1/2003 | Schuster et al. |
| 6,520,964 B2 | 2/2003 | Tallarida et al. |
| 6,558,421 B1 | 5/2003 | Fell et al. |
| 6,560,476 B1 | 5/2003 | Pelletier et al. |
| 6,575,980 B1 | 6/2003 | Robie et al. |
| 6,620,168 B1 | 9/2003 | Lombardo et al. |
| 6,626,945 B2 | 9/2003 | Simon et al. |
| 6,626,948 B2 | 9/2003 | Storer et al. |
| 6,632,225 B2 | 10/2003 | Sanford et al. |
| 6,632,235 B2 | 10/2003 | Weikel et al. |
| 6,652,587 B2 | 11/2003 | Felt et al. |
| 6,673,077 B1 | 1/2004 | Katz |
| 6,679,917 B2 | 1/2004 | Ek |
| 6,712,856 B1 | 3/2004 | Carignan et al. |
| 6,738,657 B1 | 5/2004 | Franklin et al. |
| 6,905,514 B2 | 6/2005 | Carignan et al. |
| 6,916,341 B2 | 7/2005 | Rolston |
| 6,928,742 B2 | 8/2005 | Broers et al. |
| 6,932,842 B1 | 8/2005 | Litschko et al. |
| 6,942,667 B1 | 9/2005 | Song |
| 6,944,518 B2 | 9/2005 | Roose |
| 6,969,393 B2 | 11/2005 | Pinczewski et al. |
| 6,980,849 B2 | 12/2005 | Sasso |
| 6,988,015 B1 | 1/2006 | Schopf et al. |
| 6,993,374 B2 | 1/2006 | Sasso |
| 7,008,430 B2 | 3/2006 | Dong et al. |
| 7,058,439 B2 | 6/2006 | Eaton et al. |
| 7,060,074 B2 | 6/2006 | Rosa et al. |
| 7,104,997 B2 | 9/2006 | Lionberger et al. |
| 7,115,131 B2 | 10/2006 | Engh et al. |
| 7,117,027 B2 | 10/2006 | Zheng et al. |
| 7,141,053 B2 | 11/2006 | Rosa et al. |
| 7,184,814 B2 | 2/2007 | Lang et al. |
| 7,201,762 B2 | 4/2007 | Green, Jr. et al. |
| 7,217,276 B2 | 5/2007 | Henderson et al. |
| 7,239,908 B1 | 7/2007 | Alexander et al. |
| 7,245,697 B2 | 7/2007 | Lang |
| 7,282,054 B2 | 10/2007 | Steffensmeier et al. |
| 7,292,674 B2 | 11/2007 | Lang |
| 7,347,690 B2 | 3/2008 | Jordan et al. |
| 7,364,581 B2 | 4/2008 | Michalowicz |
| 7,377,924 B2 | 5/2008 | Raistrick et al. |
| 7,379,529 B2 | 5/2008 | Lang |
| 7,467,892 B2 | 12/2008 | Lang et al. |
| 7,468,075 B2 | 12/2008 | Lang et al. |
| 7,534,263 B2 | 5/2009 | Burdulis, Jr. et al. |
| 7,618,451 B2 | 11/2009 | Berez et al. |
| 7,747,305 B2 | 6/2010 | Dean et al. |
| 7,806,896 B1 | 10/2010 | Bonutti |
| 7,881,768 B2 | 2/2011 | Lang et al. |
| 7,981,158 B2 | 7/2011 | Fitz et al. |
| 7,983,777 B2 | 7/2011 | Melton et al. |
| 8,036,729 B2 | 10/2011 | Lang et al. |
| 8,062,302 B2 | 11/2011 | Lang et al. |
| 8,066,708 B2 | 11/2011 | Lang et al. |
| 8,083,745 B2 | 12/2011 | Lang et al. |
| 8,105,330 B2 | 1/2012 | Fitz et al. |
| 8,112,142 B2 | 2/2012 | Alexander et al. |
| 8,122,592 B2 | 2/2012 | Burdulis, Jr. et al. |
| RE43,282 E | 3/2012 | Alexander et al. |
| 8,496,663 B2 | 7/2013 | White et al. |
| 8,535,319 B2 | 9/2013 | Ball |
| 8,715,362 B2 | 5/2014 | Reiley et al. |
| 8,808,303 B2 | 8/2014 | Stemniski |
| 9,017,334 B2 | 4/2015 | Carroll et al. |
| 9,125,674 B2 | 9/2015 | White et al. |
| 9,265,511 B2 | 2/2016 | White et al. |
| 9,402,640 B2 | 8/2016 | Stemniski et al. |
| 10,130,430 B2 | 11/2018 | Kao et al. |
| 10,390,842 B2 | 8/2019 | Sander |
| 10,413,308 B2 | 9/2019 | Stemniski et al. |
| 10,456,179 B2 | 10/2019 | Luna et al. |
| 10,667,867 B2 | 6/2020 | Ashish et al. |
| 10,835,265 B2 | 11/2020 | White et al. |
| 10,835,266 B2 | 11/2020 | White et al. |
| 11,147,627 B2 | 10/2021 | Gangwar et al. |
| 11,172,945 B1 | 11/2021 | Lian |
| 2001/0001120 A1 | 5/2001 | Masini |
| 2001/0010023 A1 | 7/2001 | Schwartz et al. |
| 2001/0039455 A1 | 11/2001 | Simon et al. |
| 2002/0013626 A1 | 1/2002 | Geisllich et al. |
| 2002/0029038 A1 | 3/2002 | Haines |
| 2002/0045940 A1 | 4/2002 | Giannelli et al. |
| 2002/0059049 A1 | 5/2002 | Bradbury et al. |
| 2002/0068979 A1 | 6/2002 | Brown et al. |
| 2002/0072821 A1 | 6/2002 | Baker |
| 2002/0079601 A1 | 6/2002 | Russell et al. |
| 2002/0082703 A1 | 6/2002 | Repicci |
| 2002/0087274 A1 | 7/2002 | Alexander et al. |
| 2002/0106625 A1 | 8/2002 | Hung et al. |
| 2002/0115647 A1 | 8/2002 | Halvorsen et al. |
| 2002/0120274 A1 | 8/2002 | Overaker et al. |
| 2002/0120281 A1 | 8/2002 | Overaker |
| 2002/0123817 A1 | 9/2002 | Clasbrummel et al. |
| 2002/0127264 A1 | 9/2002 | Felt et al. |
| 2002/0133230 A1 | 9/2002 | Repicci |
| 2002/0143402 A1 | 10/2002 | Steinberg |
| 2002/0151986 A1 | 10/2002 | Asculai et al. |
| 2002/0156150 A1 | 10/2002 | Asculai et al. |
| 2002/0156479 A1 | 10/2002 | Schulzki et al. |
| 2002/0173852 A1 | 11/2002 | Felt et al. |
| 2002/0183850 A1 | 12/2002 | Felt et al. |
| 2002/0198531 A1 | 12/2002 | Millard et al. |
| 2003/0028196 A1 | 2/2003 | Bonutti |
| 2003/0055500 A1 | 3/2003 | Fell et al. |
| 2003/0055501 A1 | 3/2003 | Fell et al. |
| 2003/0055502 A1 | 3/2003 | Lang et al. |
| 2003/0060882 A1 | 3/2003 | Fell et al. |
| 2003/0060883 A1 | 3/2003 | Fell et al. |
| 2003/0060884 A1 | 3/2003 | Fell et al. |
| 2003/0060885 A1 | 3/2003 | Fell et al. |

(56) References Cited

U.S. PATENT DOCUMENTS

| | | |
|---|---|---|
| 2003/0100907 A1 | 5/2003 | Rosa et al. |
| 2003/0100953 A1 | 5/2003 | Rosa et al. |
| 2003/0120347 A1 | 6/2003 | Steinberg |
| 2003/0158558 A1 | 8/2003 | Horn |
| 2003/0158606 A1 | 8/2003 | Coon et al. |
| 2003/0163137 A1 | 8/2003 | Smucker et al. |
| 2003/0173695 A1 | 9/2003 | Monkhouse et al. |
| 2003/0216669 A1 | 11/2003 | Lang et al. |
| 2003/0225457 A1 | 12/2003 | Justin et al. |
| 2003/0236521 A1 | 12/2003 | Brown et al. |
| 2003/0236526 A1 | 12/2003 | Van Hoeck et al. |
| 2004/0098133 A1 | 5/2004 | Carignan et al. |
| 2004/0102852 A1 | 5/2004 | Johnson et al. |
| 2004/0122521 A1 | 6/2004 | Lee et al. |
| 2004/0133276 A1 | 7/2004 | Lang et al. |
| 2004/0138754 A1 | 7/2004 | Lang et al. |
| 2004/0147927 A1 | 7/2004 | Tsougarakis et al. |
| 2004/0153079 A1 | 8/2004 | Tsougarakis et al. |
| 2004/0153162 A1 | 8/2004 | Sanford et al. |
| 2004/0153164 A1 | 8/2004 | Sanford et al. |
| 2004/0167390 A1 | 8/2004 | Alexander et al. |
| 2004/0167630 A1 | 8/2004 | Rolston |
| 2004/0176771 A1* | 9/2004 | Schmieding ....... A61B 17/1675 606/80 |
| 2004/0193280 A1 | 9/2004 | Webster et al. |
| 2004/0199166 A1 | 10/2004 | Schmieding et al. |
| 2004/0204644 A1 | 10/2004 | Tsougarakis et al. |
| 2004/0204760 A1 | 10/2004 | Fitz et al. |
| 2004/0236424 A1 | 11/2004 | Berez et al. |
| 2004/0249386 A1 | 12/2004 | Faoro |
| 2005/0015153 A1 | 1/2005 | Goble et al. |
| 2005/0021039 A1 | 1/2005 | Cusick et al. |
| 2005/0043807 A1 | 2/2005 | Wood |
| 2005/0049603 A1 | 3/2005 | Calton et al. |
| 2005/0055028 A1 | 3/2005 | Haines |
| 2005/0085920 A1 | 4/2005 | Williamson |
| 2005/0107883 A1 | 5/2005 | Goodfried et al. |
| 2005/0107884 A1 | 5/2005 | Johnson et al. |
| 2005/0119664 A1 | 6/2005 | Carignan et al. |
| 2005/0143745 A1 | 6/2005 | Hodorek et al. |
| 2005/0148843 A1 | 7/2005 | Roose |
| 2005/0171545 A1 | 8/2005 | Walsh et al. |
| 2005/0171612 A1 | 8/2005 | Rolston |
| 2005/0192588 A1 | 9/2005 | Garcia |
| 2005/0216305 A1 | 9/2005 | Funderud |
| 2005/0234461 A1 | 10/2005 | Burdulis et al. |
| 2005/0267584 A1 | 12/2005 | Burdulis et al. |
| 2006/0052795 A1 | 3/2006 | Burdulis et al. |
| 2006/0111722 A1 | 5/2006 | Bouadi |
| 2006/0149283 A1 | 7/2006 | May et al. |
| 2006/0200162 A1 | 9/2006 | Farling et al. |
| 2006/0235421 A1 | 10/2006 | Rosa et al. |
| 2007/0015995 A1 | 1/2007 | Lang |
| 2007/0073305 A1 | 3/2007 | Lionberger et al. |
| 2007/0118141 A1 | 5/2007 | Marchyn et al. |
| 2007/0162025 A1 | 7/2007 | Tornier et al. |
| 2007/0198022 A1 | 8/2007 | Lang et al. |
| 2007/0203430 A1 | 8/2007 | Lang et al. |
| 2007/0233128 A1 | 10/2007 | Schmieding et al. |
| 2007/0233151 A1 | 10/2007 | Chudik |
| 2007/0233156 A1 | 10/2007 | Metzger |
| 2007/0276224 A1 | 11/2007 | Lang et al. |
| 2007/0293868 A1 | 12/2007 | Delfosse et al. |
| 2008/0004709 A1 | 1/2008 | O'Neill et al. |
| 2008/0015433 A1 | 1/2008 | Alexander et al. |
| 2008/0025463 A1 | 1/2008 | Lang et al. |
| 2008/0031412 A1 | 2/2008 | Delfosse et al. |
| 2008/0058613 A1 | 3/2008 | Lang et al. |
| 2008/0058945 A1 | 3/2008 | Hajaj et al. |
| 2008/0114370 A1 | 5/2008 | Schoenefeld |
| 2008/0170659 A1 | 7/2008 | Lang et al. |
| 2008/0195109 A1 | 8/2008 | Hunter et al. |
| 2008/0195216 A1 | 8/2008 | Lang |
| 2008/0219412 A1 | 9/2008 | Lang |
| 2008/0243127 A1 | 10/2008 | Lang |
| 2008/0255565 A1 | 10/2008 | Fletcher |
| 2008/0275452 A1 | 11/2008 | Lang et al. |
| 2008/0281328 A1 | 11/2008 | Lang et al. |
| 2008/0281329 A1 | 11/2008 | Lang et al. |
| 2008/0281426 A1 | 11/2008 | Fitz et al. |
| 2008/0287953 A1 | 11/2008 | Sers |
| 2009/0024131 A1 | 1/2009 | Metzger et al. |
| 2009/0043310 A1 | 2/2009 | Rasmussen |
| 2009/0076371 A1 | 3/2009 | Lang et al. |
| 2009/0087276 A1 | 4/2009 | Rose |
| 2009/0088753 A1 | 4/2009 | Aram et al. |
| 2009/0088758 A1 | 4/2009 | Bennett |
| 2009/0099567 A1 | 4/2009 | Zajac |
| 2009/0131941 A1 | 5/2009 | Park et al. |
| 2009/0131942 A1 | 5/2009 | Aker et al. |
| 2009/0149964 A1 | 6/2009 | May et al. |
| 2009/0198244 A1 | 8/2009 | Leibel |
| 2009/0204115 A1 | 8/2009 | Dees et al. |
| 2009/0222014 A1 | 9/2009 | Bojarski et al. |
| 2009/0307893 A1 | 12/2009 | Bojarski et al. |
| 2010/0076441 A1 | 3/2010 | May et al. |
| 2010/0160917 A1 | 6/2010 | Fitz et al. |
| 2010/0262150 A1 | 10/2010 | Lian |
| 2010/0274251 A1 | 10/2010 | Ranft |
| 2010/0281678 A1 | 11/2010 | Burdulis, Jr. et al. |
| 2010/0298894 A1 | 11/2010 | Bojarski et al. |
| 2010/0305573 A1 | 12/2010 | Fitz et al. |
| 2010/0305574 A1 | 12/2010 | Fitz et al. |
| 2011/0066193 A1 | 3/2011 | Lang et al. |
| 2011/0071581 A1 | 3/2011 | Lang et al. |
| 2011/0213368 A1 | 9/2011 | Fitz et al. |
| 2011/0213373 A1 | 9/2011 | Fitz et al. |
| 2011/0213374 A1 | 9/2011 | Fitz et al. |
| 2011/0213377 A1 | 9/2011 | Lang et al. |
| 2011/0213427 A1 | 9/2011 | Fitz et al. |
| 2011/0213428 A1 | 9/2011 | Fitz et al. |
| 2011/0213429 A1 | 9/2011 | Lang et al. |
| 2011/0213430 A1 | 9/2011 | Lang et al. |
| 2011/0213431 A1 | 9/2011 | Fitz et al. |
| 2011/0218539 A1 | 9/2011 | Fitz et al. |
| 2011/0218542 A1 | 9/2011 | Lian et al. |
| 2011/0218584 A1 | 9/2011 | Fitz et al. |
| 2011/0230888 A1 | 9/2011 | Lang et al. |
| 2011/0238073 A1 | 9/2011 | Lang et al. |
| 2011/0313423 A1 | 12/2011 | Lang et al. |
| 2011/0319897 A1 | 12/2011 | Lang et al. |
| 2011/0319900 A1 | 12/2011 | Lang et al. |
| 2012/0029520 A1 | 2/2012 | Lang et al. |
| 2012/0041446 A1 | 2/2012 | Wong et al. |
| 2012/0066892 A1 | 3/2012 | Lang et al. |
| 2012/0071881 A1 | 3/2012 | Lang et al. |
| 2012/0071882 A1 | 3/2012 | Lang et al. |
| 2012/0071883 A1 | 3/2012 | Lang et al. |
| 2012/0072185 A1 | 3/2012 | Lang et al. |
| 2012/0101503 A1 | 4/2012 | Lang et al. |
| 2012/0143197 A1 | 6/2012 | Lang et al. |
| 2012/0151730 A1 | 6/2012 | Fitz et al. |
| 2012/0158001 A1 | 6/2012 | Burdulis, Jr. et al. |
| 2012/0239045 A1* | 9/2012 | Li ....................... A61B 17/157 606/88 |
| 2013/0261628 A1 | 10/2013 | Burley et al. |
| 2014/0270065 A1 | 9/2014 | Aram et al. |
| 2014/0276853 A1 | 9/2014 | Long et al. |
| 2014/0324059 A1* | 10/2014 | Stemniski ............ A61B 17/15 606/96 |
| 2015/0190147 A1* | 7/2015 | Ferragamo ......... A61B 17/1675 606/80 |
| 2015/0320567 A1 | 11/2015 | Terrill et al. |
| 2016/0262903 A1 | 9/2016 | West |
| 2018/0303490 A1 | 10/2018 | Loring et al. |
| 2020/0015867 A1 | 1/2020 | Luna et al. |
| 2020/0046412 A1* | 2/2020 | Nachtrab ............ A61F 2/4202 |
| 2020/0113712 A1 | 4/2020 | Luna et al. |

(56) References Cited

U.S. PATENT DOCUMENTS

| | | | |
|---|---|---|---|
| 2020/0337850 A1 | 10/2020 | Reiley | |
| 2021/0378753 A1 | 12/2021 | Christen et al. | |

FOREIGN PATENT DOCUMENTS

| | | |
|---|---|---|
| CN | 101111197 | 1/2008 |
| CN | 101790353 A | 7/2010 |
| DE | 2306552 | 8/1974 |
| DE | 3516743 | 11/1986 |
| DE | 44 34 539 | 4/1996 |
| DE | 20303498 | 8/2003 |
| DE | 202008017199 | 3/2009 |
| DE | 202008017200 | 3/2009 |
| DE | 202012100175 U1 | 2/2012 |
| EP | 0377901 | 7/1990 |
| EP | 0528080 | 2/1993 |
| EP | 0530804 | 10/1993 |
| EP | 0626156 | 11/1994 |
| EP | 0704193 | 4/1996 |
| EP | 0896825 | 2/1999 |
| EP | 0938869 | 9/1999 |
| EP | 0613380 | 12/1999 |
| EP | 0993807 | 4/2000 |
| EP | 1074229 | 2/2001 |
| EP | 1077253 | 2/2001 |
| EP | 1120087 | 8/2001 |
| EP | 1129675 | 9/2001 |
| EP | 1132061 | 9/2001 |
| EP | 0732091 | 12/2001 |
| EP | 0814731 | 8/2002 |
| EP | 1234552 | 8/2002 |
| EP | 1234555 | 8/2002 |
| EP | 0809987 | 10/2002 |
| EP | 0833620 | 10/2002 |
| EP | 2124832 | 12/2009 |
| EP | 2967697 B1 | 4/2018 |
| EP | 3354233 B1 | 10/2019 |
| FR | 2819714 | 7/2002 |
| GB | 1451283 | 9/1976 |
| GB | 2291355 | 1/1996 |
| GB | 2348373 | 10/2000 |
| GB | 2480846 B | 4/2017 |
| JP | 8-173465 | 7/1996 |
| JP | 9-206322 | 8/1997 |
| JP | H11500035 A | 1/1999 |
| JP | 2002-102236 | 4/2002 |
| JP | 2006150055 A | 6/2006 |
| JP | 2007508123 A | 4/2007 |
| JP | 2007518453 A | 7/2007 |
| JP | 2007519477 A | 7/2007 |
| JP | 2007536011 A | 12/2007 |
| JP | 2008-537689 | 9/2008 |
| JP | 2009148597 A | 7/2009 |
| JP | 2011526189 A | 10/2011 |
| JP | 2012518517 A | 8/2012 |
| JP | 2013500810 A | 1/2013 |
| JP | 2013511358 A | 4/2013 |
| JP | 5412334 B2 | 2/2014 |
| JP | 2014131738 A | 7/2014 |
| WO | WO 87/02882 | 5/1987 |
| WO | WO 90/009769 | 9/1990 |
| WO | WO 93/004710 | 3/1993 |
| WO | WO 93/009819 | 5/1993 |
| WO | WO 93/025157 | 12/1993 |
| WO | WO 95/027450 | 10/1995 |
| WO | WO 95/028688 | 10/1995 |
| WO | WO 95/030390 | 11/1995 |
| WO | WO 95/032623 | 12/1995 |
| WO | 1996025106 A1 | 8/1996 |
| WO | WO 96/024302 | 8/1996 |
| WO | WO 97/025942 | 7/1997 |
| WO | WO 97/026847 | 7/1997 |
| WO | WO 97/027885 | 8/1997 |
| WO | WO 97/038676 | 10/1997 |
| WO | WO 98/012994 | 4/1998 |
| WO | WO 98/20816 | 5/1998 |
| WO | WO 98/030617 | 7/1998 |
| WO | WO 98/32384 | 7/1998 |
| WO | WO 99/002654 | 1/1999 |
| WO | WO 99/008598 | 2/1999 |
| WO | WO 99/008728 | 2/1999 |
| WO | WO 99/042061 | 8/1999 |
| WO | WO 99/047186 | 9/1999 |
| WO | WO 99/051719 | 10/1999 |
| WO | WO 99/056674 | 11/1999 |
| WO | WO 00/009179 | 2/2000 |
| WO | WO 00/015153 | 3/2000 |
| WO | WO 00/035346 | 6/2000 |
| WO | WO 00/048550 | 8/2000 |
| WO | WO 00/059411 | 10/2000 |
| WO | WO 00/074554 | 12/2000 |
| WO | WO 01/010356 | 2/2001 |
| WO | WO 01/017463 | 3/2001 |
| WO | WO 01/019254 | 3/2001 |
| WO | WO 01/035968 | 5/2001 |
| WO | WO 01/045764 | 6/2001 |
| WO | 2001066021 A1 | 9/2001 |
| WO | WO 01/068800 | 9/2001 |
| WO | WO 01/070142 | 9/2001 |
| WO | WO 01/091672 | 12/2001 |
| WO | WO 02/000270 | 1/2002 |
| WO | WO 02/000275 | 1/2002 |
| WO | WO 02/002158 | 1/2002 |
| WO | WO 02/022013 | 3/2002 |
| WO | WO 02/022014 | 3/2002 |
| WO | WO 02/023483 | 3/2002 |
| WO | WO 02/034310 | 5/2002 |
| WO | WO 02/036147 | 5/2002 |
| WO | WO 02/096268 | 12/2002 |
| WO | WO 03/007788 | 1/2003 |
| WO | WO 03/037192 | 5/2003 |
| WO | WO 03/047470 | 6/2003 |
| WO | WO 03/051210 | 6/2003 |
| WO | WO 03/055400 | 7/2003 |
| WO | WO 2003/065907 | 8/2003 |
| WO | WO 04/043305 | 5/2004 |
| WO | WO 04/049981 | 6/2004 |
| WO | 2005037135 A2 | 4/2005 |
| WO | WO 05/051239 | 6/2005 |
| WO | WO 05/051240 | 6/2005 |
| WO | 2006022923 A1 | 3/2006 |
| WO | 2006023824 A2 | 3/2006 |
| WO | WO 06/060795 | 6/2006 |
| WO | 2006099270 A2 | 9/2006 |
| WO | WO 06/127283 | 11/2006 |
| WO | WO 07/041375 | 4/2007 |
| WO | WO 2007/061983 | 5/2007 |
| WO | 2007084846 A2 | 7/2007 |
| WO | WO 07/092841 | 8/2007 |
| WO | WO 08/112996 | 9/2008 |
| WO | WO 08/157412 | 12/2008 |
| WO | WO 2009/001083 | 12/2008 |
| WO | WO 09/111639 | 9/2009 |
| WO | 2009143374 A2 | 11/2009 |
| WO | WO2009158522 | 12/2009 |
| WO | WO 2010/099142 | 9/2010 |
| WO | WO 2010/120346 | 10/2010 |
| WO | WO 2010/121147 | 10/2010 |
| WO | 2010135156 A1 | 11/2010 |
| WO | 2011015863 A1 | 2/2011 |
| WO | 2011063281 A1 | 5/2011 |
| WO | WO 2011/110374 | 9/2011 |
| WO | 2011151657 A1 | 12/2011 |
| WO | 2012088036 A1 | 6/2012 |
| WO | 2012116089 A1 | 8/2012 |
| WO | 2012158917 A1 | 11/2012 |
| WO | 2013169475 A1 | 11/2013 |
| WO | 2014152535 A1 | 9/2014 |
| WO | 2014165060 A2 | 10/2014 |
| WO | 2015167581 A1 | 11/2015 |
| WO | 2016005722 A1 | 1/2016 |
| WO | 2016039762 A1 | 3/2016 |
| WO | 2016148675 A1 | 9/2016 |
| WO | 2016181168 A1 | 11/2016 |

(56) References Cited

FOREIGN PATENT DOCUMENTS

| WO | WO 2020124052 | 6/2020 |
| WO | WO 2020242542 | 12/2020 |
| WO | WO 2022015877 | 1/2022 |
| WO | WO 2022094052 | 5/2022 |

OTHER PUBLICATIONS

Stryker Trauma GmbH, "Bixcut Reamer System" Osteosynthesis, 8 sheets, 2009.

Synthes, "SynReam, The Synthes Reaming System" Surgical Technique, 22 pages, 2005.

Andersson, et al., "Macintosh Arthroplasty In Rheumatoid Arthritis," Acta. Orthrop. Scand., 1974, pp. 245-259, 45(2).

Argenson, et al., "Is There a Place for Patellofemoral Arthroplasty? ,"Clinical Orthopaedics and Related Research No. 321, 1995, pp. 162-167.

Birnbaum, et al., "Computer-Assisted Orthopedic Surgery with Individual Templates and Comparison to Conventional Operation Method," Spine, Feb. 2001, pp. 365-369, vol. 26, No. 4.

Chelule, et al., "Computer Aided Design of Personalized Jigs in Total Knee Replacement," 3rd Annual Meeting of CAOS Int'l Proc., Jun. 18-21, 2003, pp. 58-59, Spain.

Dore, S., Bobyn, J., Drouin, G., Dussault, R., Gariepy, R., "Use of Computerized Tomography and Numerical Control Machining for the Fabrication of Custom Arthroplasty Prostheses." Second World Congress on Biomaterials, 10th Annual Meeting of the Society for Biomaterials, p. 233, Washington, D.C., Apr. 27-May 1, 1984.

De Winter, et al., "The Richards Type II Patellofemoral Arthroplasty," Acta Orthop Scand, 2001, pp. 487-490, 72(5).

Delp, et al., "A Graphics-Based Software System to Develop and Analyze Models of Musculoskeletal Structures," Comput. Biol. Med., 1995, pp. 21-34, vol. 25, No. 1.

Farrar, et al., "Computed Tomography Scan Scout Film for Measurement of Femoral Axis in Knee Arthroplasty," J. Arthroplasty, 1999, pp. 1030-1031, vol. 14, No. 8.

Final Official Action for U.S. Appl. No. 13/465,547, dated Feb. 26, 2014.

Froemel, et al., "Computer Assisted Template Based Navigation for Total Knee Replacement," Documents presented at CAOS on Jun. 17, 2001, 4 pages.

Hafez, et al., "Computer Assisted Total Knee Replacement: Could a Two-Piece Custom Template Replace the Complex Conventional Instrumentations?", 4th Annual Meeting of CAOS Int'l Proc., Jun. 16-19, 2004, pp. 63-64, Chicago.

Hafez, et al., "Computer-Assisted Total Hip Arthroplasty: The Present and the Future," Future Rheumatol, 2006, pp. 121-131, vol. 1.

Kim, et al., "Measurement of Femoral Neck Anteversion in 3D. Part 1: 3D Imaging Method," Med. and Biol. Eng. and Computing, 2000, pp. 603-609, vol. 38, No. 6.

Lam, et al., "X-Ray Diagnosis: A Physician's Approach," 1998, Title page and Table of Contents pages Only, ISBN 9813083247, Springer-Verlag publishers.

Lam. et al.. "VarusNalgus Alignment of the Femoral Component in Total Knee Arthroplasty," The Knee, 2003, pp. 237-241, vol. 10.

Lu, et al., "In Vitro Degradation of Porous poly(L-lactic acid) Foams," Biomaterials, Aug. 2000, pp. 1595-1605, 21(15).

Mahaisavariya, et al., "Morphological Study of the Proximal Femur: a New Method of Geometrical Assessment Using 3-Dimensional Reverse Engineering", Medical Engineering & Physics 24 (2002) pp. 617-622.

Marler, et al., "Soft-Tissue Augmentation with Injectable Alginate and Synegeneic Fibroblasts," Plastic & Reconstructive Surgery, May 2000 pp. 2049-2058, 105(6).

PCT/US2010/025143, International Preliminary Report on Patentability and Written Opinion, Sep. 9, 2011.

Portheine, et al., "Potentials of CT-based Planning and Template-based Procedure in Hip and Knee Surgery," Orth. Prac., 2000, pp. 786-791, vol. 36, English Translation with Certification.

Radermacher, "Computer Assisted Matching of Planning and Execution in Orthopedic Surgery," Slide Presentation, Nov. 29, 1993, 22 pages.

Radermacher, et al., "Computer-Assisted Planning and Operation in Orthopedics," Orth. Prac. 36th Year, Dec. 2000, pp. 731-737, English Translation with Certification.

Radermacher, et al., "Template Based Navigation—an Efficient Technique for Hip and Knee Surgery," CAOS First Asian Meet, Mar. 27-28, 2004, pp. 45-50, India.

Rau, et al., "Small and Neat," Medical Tech. Int'l, 1993-94, pp. 65, 67 and 69.

Schkommadau, et al., "Clinical Experience With the Individual Template Technique," Orth. Prac., 2001, pp. 19-22, vol. 37, No. 1, English Translation with Certification.

Seel, et al., "Three-Dimensional Planning and Virtual Radiographs in Revision Total Hip Arthroplasty for Instability," Clinical Orthopaedics and Related Research, Jan. 2006, pp. 35-38, No. 442.

Slone, et al., "Body CT: a Practical Approach," 1999, Title page and Table of Contents pages Only, ISBN 007058219, McGraw-Hill.

Staudte, et al., "Computer-Assisted Operation Planning and Technique in Orthopedics," North Rhine-Westphalia Acad. for Sciences, Lecture N.444, 2000, 17 pages, ISSN 0944-8799, in German.

Staudte, et al., "Computer-Assisted Operation Planning and Technique in Orthopedics," North Rhine-Westphalia Acad. for Sciences, Lecture N.444, 2000, 34 pages, ISSN 0944-8799, English Translation with Certification.

Stauffer, et al., "The Macintosh Prosthesis. Prospective Clinical and Gait Evaluation," Arch. Surg., 1975, pp. 717-720, 110(6).

Stout, et al., "X-Ray Structure Determination: A Practical Guide," 1989, Title page and Table of Contents pages Only, ISBN 0471607118, John Wiley & Sons.

Tamez-Pena, et al., "MRIIsotropic Resolution Reconstruction from Two Orthogonal Scans," Proceedings of the SPIE—The International Society for Optical Engineering SOIE-OMT, 2001, pp. 87-97, vol. 4322.

Testi, et al., "Border Tracing Algorithm Implementation for the Femoral Geometry Reconstruction," Camp. Meth. and Programs in Biomed., 2001, pp. 175-182, vol. 65.

Vandeberg, et al., "Assessment of Knee Cartilage in Cadavers with Dual-Detector Spiral CT Arthrography and MR Imaging," Radiology, Feb. 2002, pp. 430-435, 222(2).

Wiese, et al., "Biomaterial Properties and Biocompatibility in Cell Culture of a Novel Self-Inflating Hydrogel Tissue Expander," J. Biomedical Materials Research Part A, Nov. 2000, pp. 179-188, 54(2).

Woolson, S., Fellingham, L., Dev, P., and Vassiliadis, A., "Three Dimensional Imaging of Bone from Analysis of Computed Tomography Data." Orthopedics, vol. 8, No. 10, pp. 1269-1273, Oct. 1985.

Yusof, et al., "Preparation and Characterization of Chitin Beads as a Wound Dressing Precursor," J. Biomedical Materials Research Part A, Oct. 2000, pp. 59-68, 54(1).

Examination Report issued in connection with corresponding Indian Patent Application No. 2004/KOLNP/2013, Nov. 30, 2018, 10 pages.

First Examination Repot issued in connection with corresponding Australian Patent Application No. 2018204063, Jul. 10, 2019, 2 pages.

Second Examination Report issued in connection with corresponding Australian Patent Application No. 2019261830, May 4, 2021, 9 pages.

First Examination Repot issued in connection with corresponding Australian Patent Application No. 2019261830, Dec. 21, 2020, 4 pages.

First Office Action for Japanese Patent Application No. 2011-552091, dated Oct. 25, 2013.

Examination Report issued in connection with corresponding Indian Patent Application No. 2004/KOLNP/2013, Nov. 30, 2018, 7 pages.

First Office Action issued in connection with corresponding Chinese Patent Application No. 201810973637.8, Nov. 28, 2018, 6 pages.

(56) References Cited

OTHER PUBLICATIONS

First Examination Report issued in connection with corresponding Australian Patent Application No. 201926183, Dec. 21, 2020, 4 pages.
Australian report for Application 2015202080 issued Jul. 5, 2016, 4 pgs.
European report for Application 22179220.3-1122 dated Feb. 20, 2023, 14 pgs.
European search report for Application 13198280 dated Feb. 5, 2014, 4 pgs.
Wright "Infinity Total Ankle System Surgical Technique", 76 pgs.
Australian report for Application 2019246766 dated Apr. 17, 2020, 9 pgs.
International search report for PCT/US2021/057014 dated Mar. 17, 2022, 19 pgs.
Australian report for Application 2018200073 dated Dec. 24, 2018, 3 pgs.
International search report for PCT/US2021/071308 dated Dec. 27, 2021, 10 pgs.
European search report for Application 16895669.6-1122, PCT/US2016023739, EP 16895669 dated Oct. 21, 2019, 6 pgs.
European search report for Application 22185245.2-1122, EP 22185245 dated Nov. 28, 2022, 9 pgs.
International search report for PCT/US2022/011256 dated Mar. 21, 2022 8 pgs.
Canadian report for 2,904,652 dated Jan. 28, 2020,5 pgs.
Arthrex, "Fibulock Nail Angle Fracture System", 2022, 4 pages.
International search report for PCT/US2021/025873 dated Sep. 2, 2021, 14 pgs.
Wright "Prophecy Inbone: Preoperative Navigation Guides Surgical Technique", 64 pgs.
Canadian report for3,014,284 dated Jun. 17, 2019, 4 pgs.
International search report for PCT/US2022/070144 dated May 12, 2022, 19 pgs.
European search report for Application 18160378.8-112, EP 18160378 dated Jun. 29, 2018, 7 pgs.
Australian report for Application 2016398429 dated Jan. 21, 2019, 4 pgs.
International search report for PCT/US2014/027448 dated Sep. 15, 2015, 8 pgs.
Wright "Sidekick: Coretrak Tube Fixator Surgical Technique", 8 pgs.
Australian report for Application 2020277219 dated Nov. 19, 2021, 7 pgs.
International search report for PCT/US2016/023729 dated Feb. 14, 2017, 14 pgs.
European search report for Application 14768333.8-1664/2967697, EP 14768333 dated Jan. 30, 2017, 10 pgs.
Australian report for Application 2019213412 dated Sep. 3, 2020, 5 pgs.
Orthopedic Designs, "ODi North America", 2 pgs.
Canadian report for 2,904,652 dated Jun. 2, 2020, 6 pgs.
Wright "Inbone II: Total Ankle System Surgical Technique", 64 pgs.
Wright "Infinity: Total Ankle System Surgical Technique", 79 pgs.
First Office Action issued in connection with Japanese Patent Application No. 2020-016447, Apr. 6, 2021, 4 pages.
First Office Action issued in connection with Japanese Patent Application No. 2016-117842, Sep. 12, 2017, 5 pages.
Second Office Action issued in connection with Chinese Patent Application No. 201480027987.4, Jul. 16, 2018, 6 pages.
First Office Action issued in connection with Japanese Patent Application No. 2018-178853, Sep. 3, 2019, 3 pages.
First Office Action issued in connection with Japanese Patent Application No. 2016-502443, Jan. 23, 2018, 3 pages.
International Search Report issued in connection with International Patent Application No. PCT/US2022/011256, Mar. 21, 2022, 8 pages.
International Search Report issued in connection with International Patent Application No. PCT/US2004/025056, Feb. 14, 2005, 3 pages.
International Search Report issued in connection with International Patent Application No. PCT/US2014/027448, Jul. 7, 2014, 11 pages.
First Office Action issued in connection with Japanese Patent Application No. 2018-092289, Mar. 5, 2019, 2 pages.

* cited by examiner

Anterior View

Lateral View

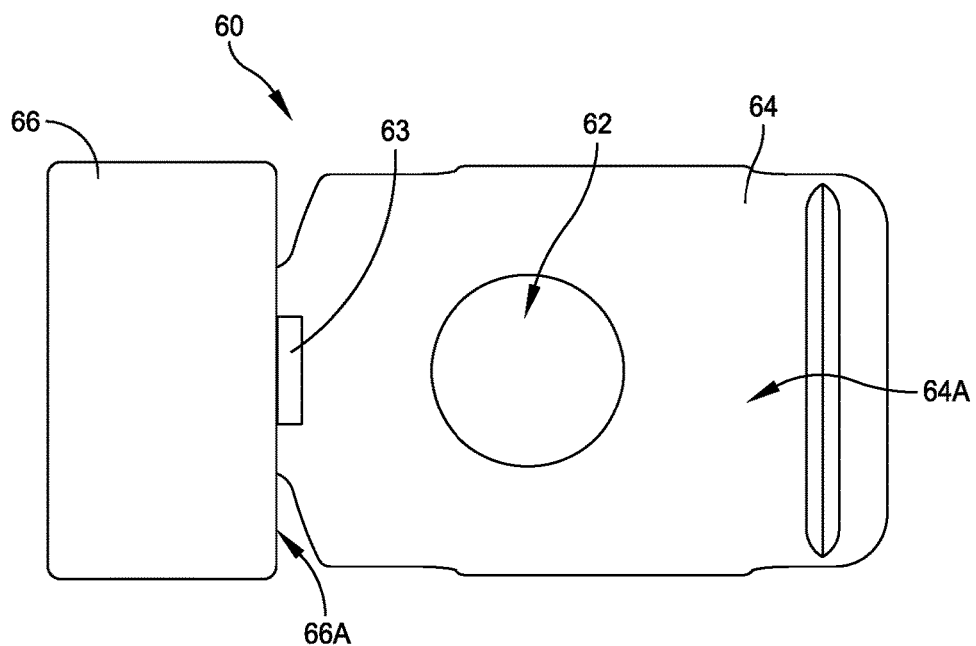
FIG. 6A
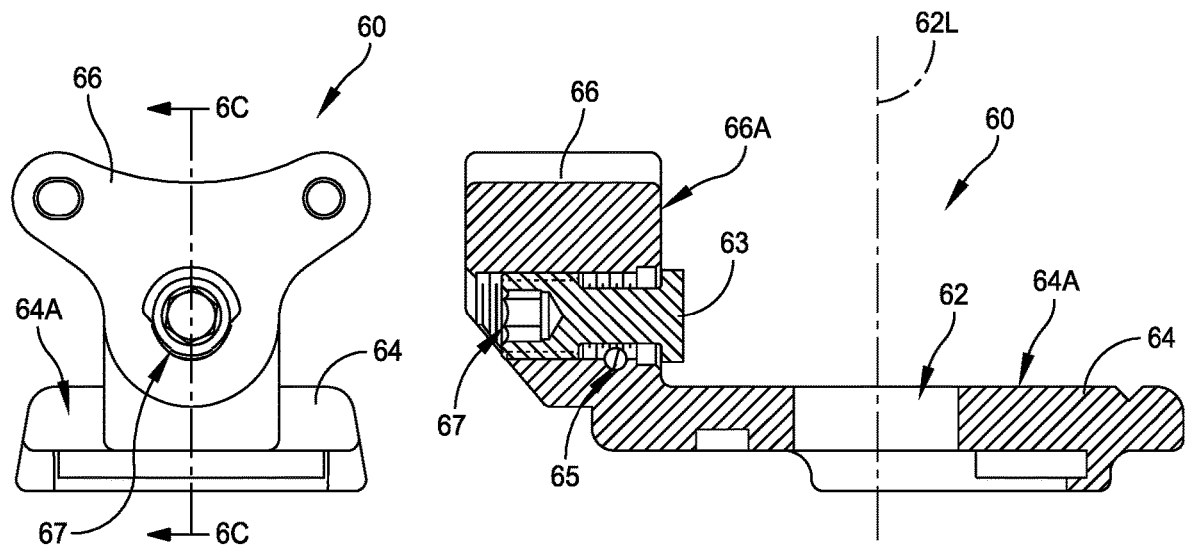
FIG. 6B
FIG. 6C

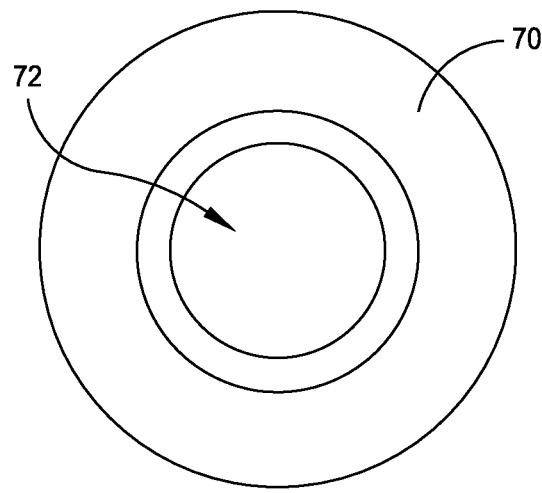
FIG. 8A
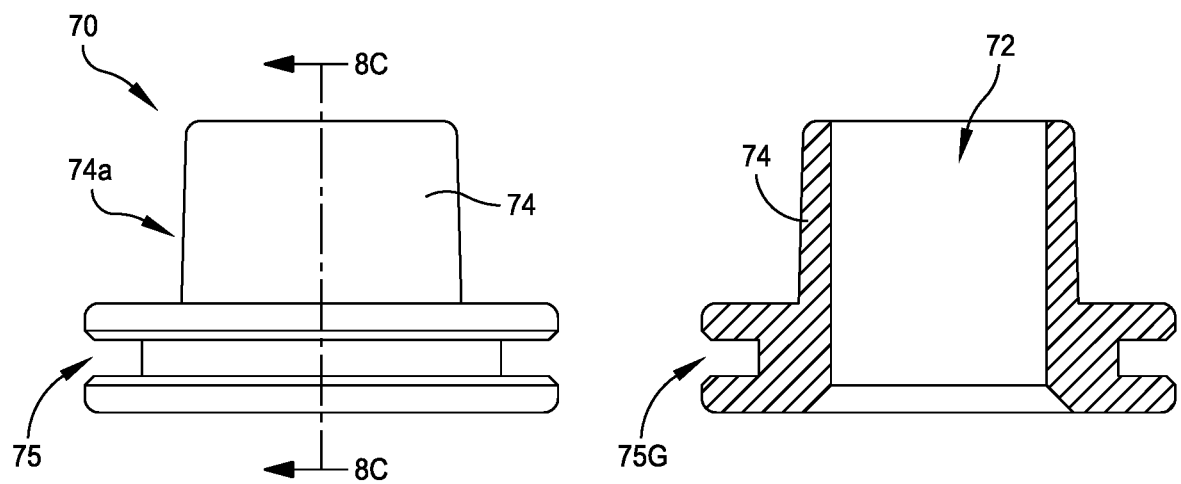
FIG. 8B
FIG. 8C

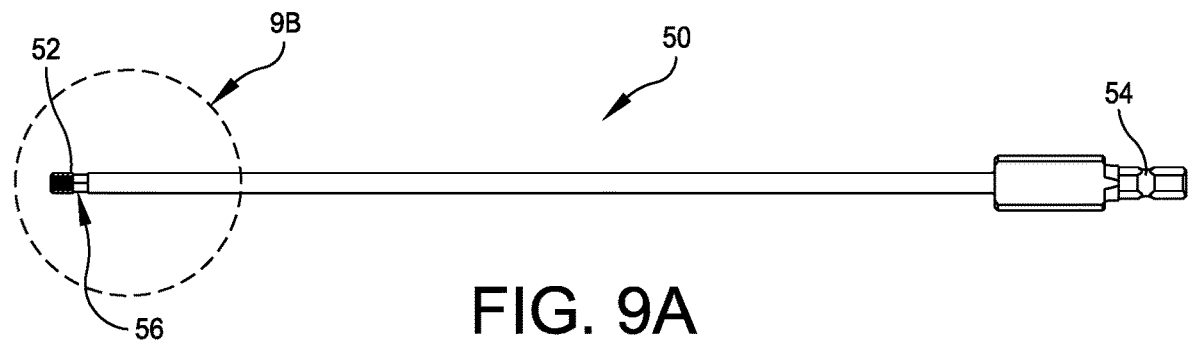
FIG. 9A
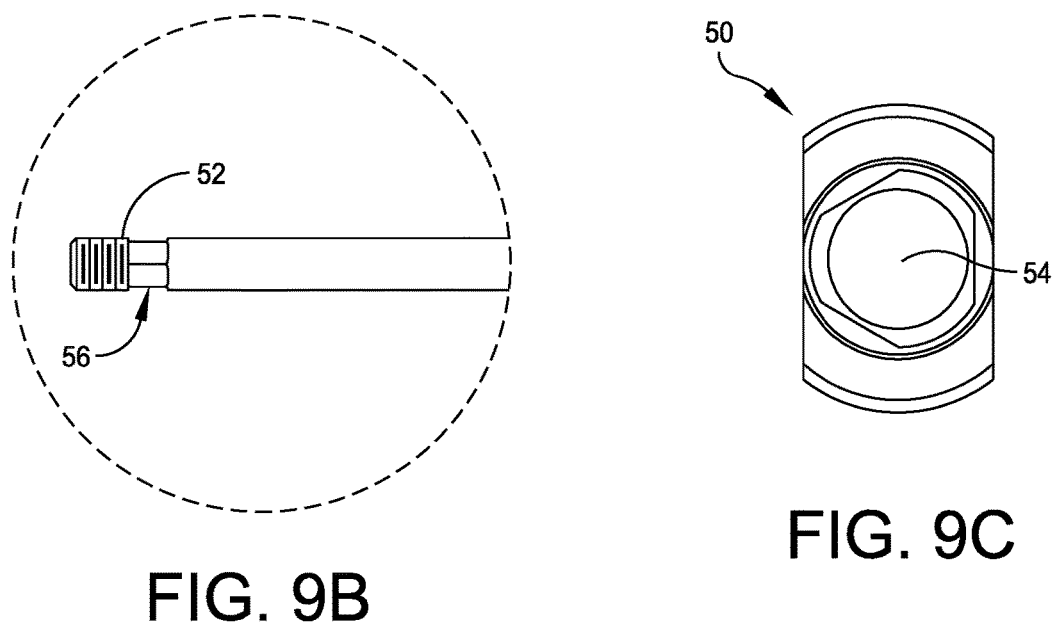
FIG. 9B
FIG. 9C

PREPARING A TIBIA FOR RECEIVING TIBIAL IMPLANT COMPONENT OF A REPLACEMENT ANKLE

CROSS-REFERENCE TO RELATED APPLICATIONS

This application is a National Stage Application, filed under 35 U.S.C. 371, of International Patent Application No. PCT/US2022/011256, filed on Jan. 5, 2022, which claims priority to U.S. Provisional Patent Application No. 63/152,996, filed Feb. 24, 2021. Any and all applications for which a foreign or domestic priority claim is identified in the Application Data Sheet as filed with the present application are hereby incorporated by reference under 37 C.F.R. § 1.57.

FIELD OF DISCLOSURE

The present disclosure relates to an ankle replacement procedure.

BACKGROUND

An ankle joint may become severely damaged and painful due to arthritis from prior ankle surgery, bone fracture, infection, osteoarthritis, post-traumatic osteoarthritis or rheumatoid arthritis, for example. Options for treating the injured ankle have included anti-inflammatory and pain medications, braces, physical therapy, amputation, joint arthrodesis, and total ankle replacement.

Current ankle joint replacement options include preparing the distal end of the tibia by drilling through the calcaneus and the talus from the bottom of the foot to access the distal end of the tibia to ream the tibial intramedullary canal. Such approaches require an additional incision in the heel. The patient's recovery time can be extended and can delay the weight-bearing time after the surgery.

A recent improved ankle joint replacement procedure involves approaching the ankle joint space with a broach from the anterior side and preparing the intramedullary canal of the tibia manually.

SUMMARY

Disclosed is a method of preparing an intramedullary canal in a tibia for receiving a tibial implant. In some embodiments, the method comprises:
(a) forming an ankle joint space by resecting the distal end of a tibia;
(b) forming a cavity for a bone interface feature into the distal end of the tibia, wherein the cavity has a proximal end that is closed within the tibia and an opening at the distal end of the tibia;
(c) drilling a hole into the tibia using a flexible reamer fitted with a pilot cutting bit from a location that is proximal with respect to the cavity formed in the tibia until the flexible reamer exits into the cavity at a location that is at the proximal end of the cavity;
(d) inserting the flexible reamer further into the cavity until the pilot cutting bit is within the ankle joint space;
(e) slipping a stem reamer guide over the pilot cutting bit and inserting the stem reamer guide into the cavity's opening at the distal end of the tibia;
(f) adjusting the stem reamer guide in anterior-posterior direction to align to flexible reamer's trajectory while bet centering in coronal-sagittal direction depending on the insertion point direction;
(g) replacing the pilot cutting bit with a tibial reamer bit that is configured for reaming in the proximal direction; and
(h) forming an extended cavity by pulling the tibial reamer bit through the stem reamer guide in the proximal direction and reaming the proximal end of the cavity by pulling the flexible reamer in the proximal direction.

According to another aspect of the present disclosure, the method comprises:
(a) forming an ankle joint space by resecting the distal end of a tibia;
(b) forming a cavity for a bone interface feature into the distal end of the tibia, wherein the cavity has a proximal end that is closed within the tibia and an opening at the distal end of the tibia;
(c) adjusting the alignment assembly for stem reamer guide placement in anterior-posterior direction to prepare a hole into the tibia;
(d) inserting a stem reamer guide into the cavity's opening at the distal end of the tibia;
(e) drilling a hole into the tibia using a flexible reamer fitted with a pilot cutting bit from a location that is proximal with respect to the cavity while centering in coronal-sagittal direction depending on the insertion point direction;
(f) inserting the flexible reamer further into the cavity until the pilot cutting bit extends through the stem reamer guide and is within the ankle joint space;
(g) replacing the pilot cutting bit with a tibial reamer bit that is configured for reaming in the proximal direction; and
(h) forming an extended cavity by pulling the tibial reamer bit through the stem reamer guide in the proximal direction and reaming the proximal end of the cavity by pulling the flexible reamer in the proximal direction.

BRIEF DESCRIPTION OF THE DRAWINGS

The inventive concepts of the present disclosure will be described in more detail in conjunction with the following drawing figures. The structures in the drawing figures are illustrated schematically and are not intended to show actual dimensions.

FIG. 6A is a top-down view illustration of a guide for a 90° reamer for forming a hole/cavity in the distal end of a tibia for receiving a stem reamer guide.

FIG. 6B is an anterior view illustration of the guide of FIG. 6A.

FIG. 6C is a cross-sectional view of the guide shown in FIGS. 6A-6B, where the section is taken through the section line 6C-6C shown in FIG. 6B.

FIG. 8A is an illustration of a stem reamer guide.

FIG. 8B is a side view illustration of the stem reamer guide of FIG. 8A.

FIG. 8C is a cross-sectional view illustration of the stem reamer guide, where the section is taken through the section line 8C-8C shown in FIG. 8B.

FIGS. 9A and 9B are a side view and a detailed side view illustrations, respectively, of an example of a flexible reamer shaft that can be used with the method disclosed herein.

FIG. 9C is an end view illustration the flexible reamer shaft.

DETAILED DESCRIPTION

Figure 1:
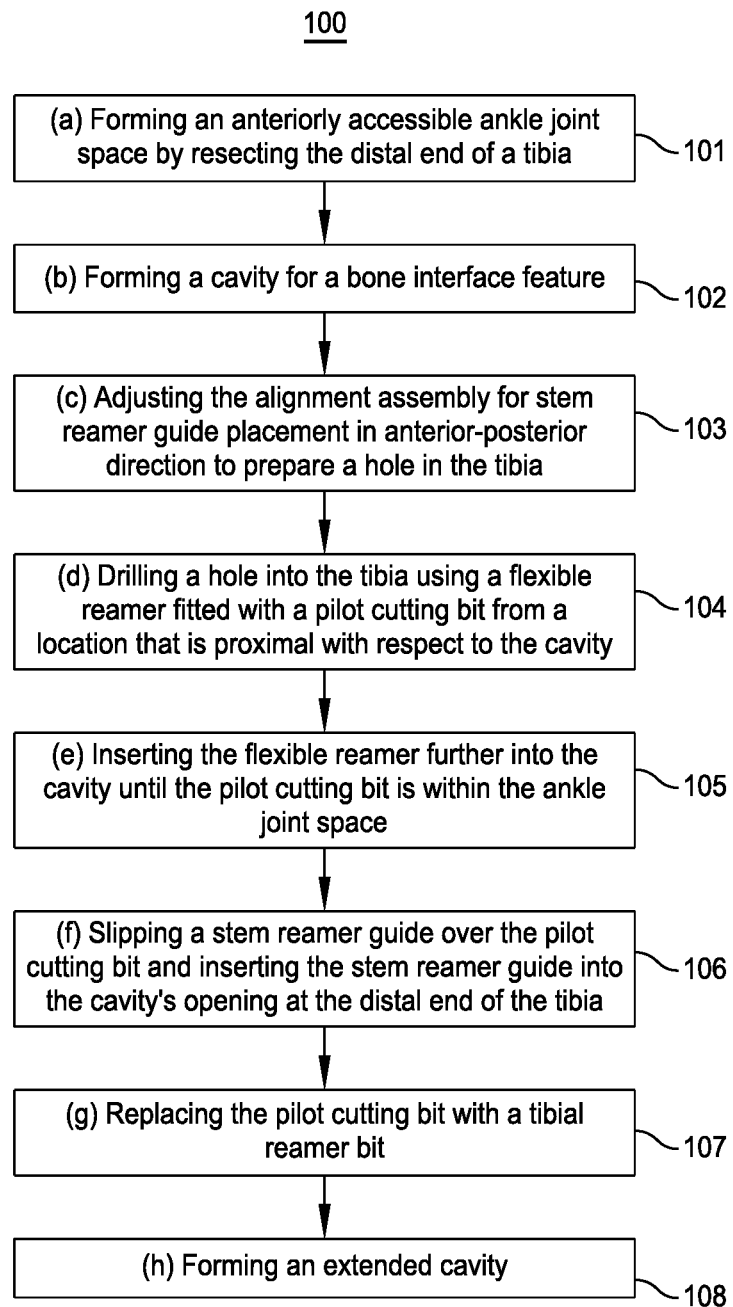
FIG. 1 is a flowchart representation of a method according to an embodiment of the present disclosure.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. When only a single machine is illustrated, the term "machine" shall also be taken to include any collection of machines that individually or jointly execute a set (or multiple sets) of instructions to perform any one or more of the methodologies discussed herein. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

Unless otherwise expressly stated, it is in no way intended that any method set forth herein be construed as requiring that its steps be performed in a specific order, nor that with any apparatus, specific orientations be required, unless specified as such. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Figure 3A:
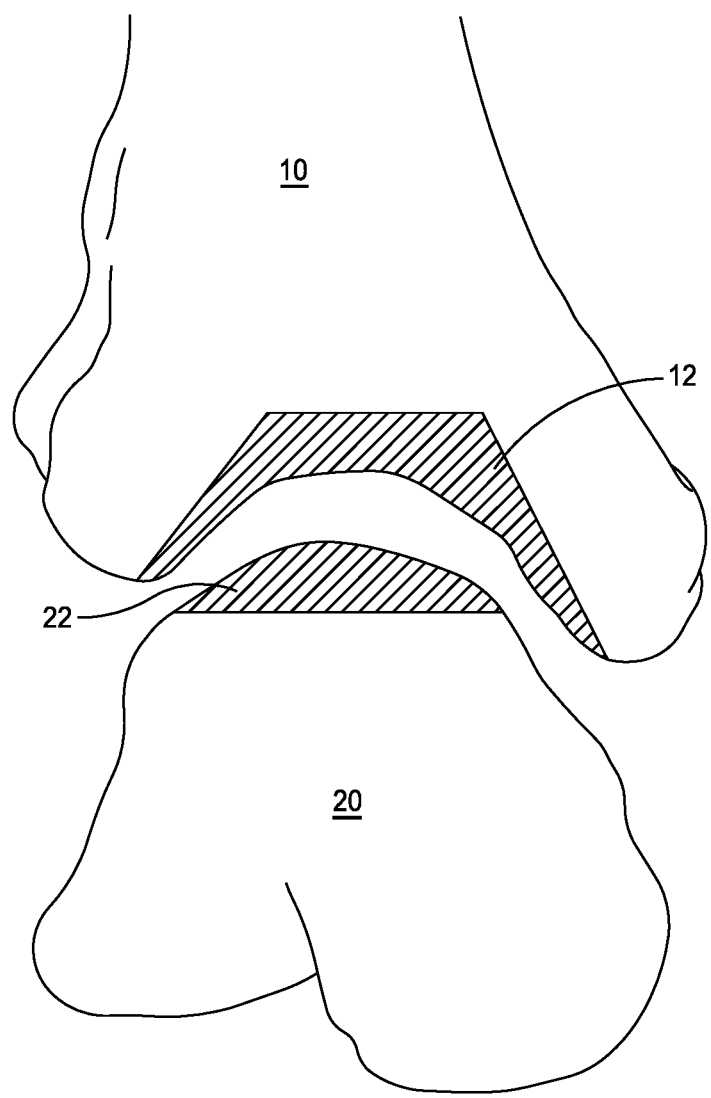
FIG. 3A illustrates one example of tibial and talar resections having been made in accordance with some embodiments.
Figure 3B:
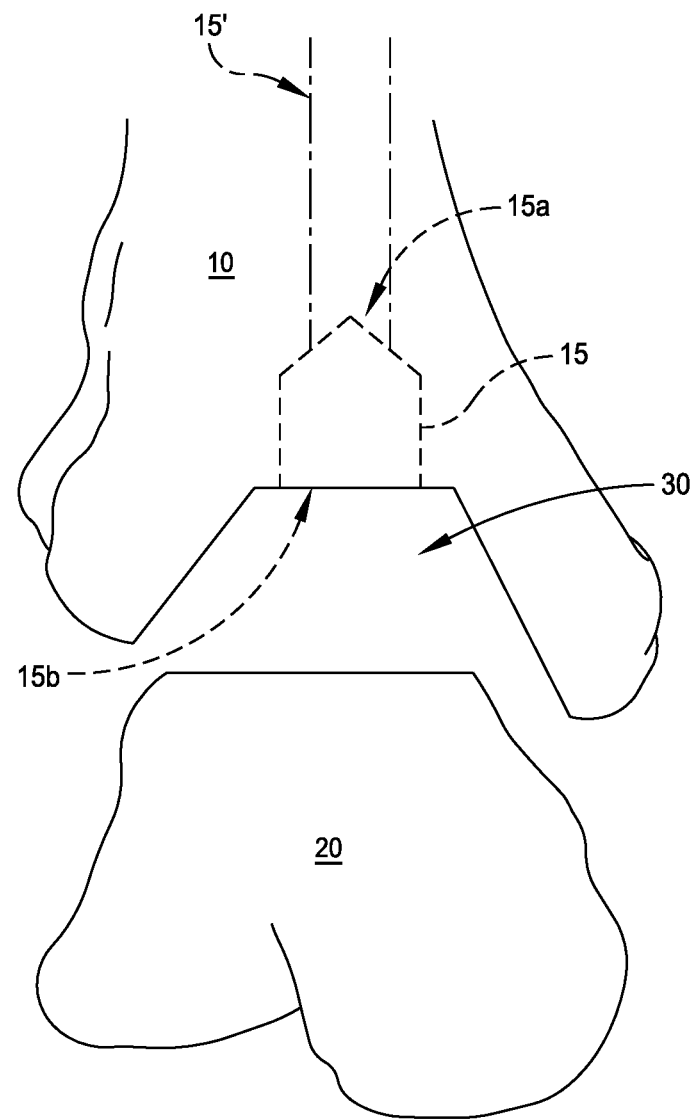
FIG. 3B illustrates one example of an ankle joint space formed by the tibia and ankle resections shown in FIG. 3A.

Referring to FIG. 1, an embodiment of a method for reaming a cavity in a tibia for receiving a tibial stem component of a total ankle replacement prosthesis according to the present disclosure is represented by the flowchart 100. FIGS. 3A-3B are illustrations of a tibia 10 and a talus 20 of an exemplary ankle joint to help with the description.

The method comprises a step (a) of forming an ankle joint space 30 by resecting a portion 12 of the distal end of a tibia 10 by making a box cut as shown in FIG. 3A. If a larger ankle joint space is necessary, a superior portion 22 of the associated talus 20 can also be resected at this time. (Box 101 in the flowchart 100). In some embodiments, the ankle joint space 30 thus formed is anteriorly accessible. In some other embodiments, the ankle joint space 30 can be formed to be accessible from other direction if needed.

Figure 12:
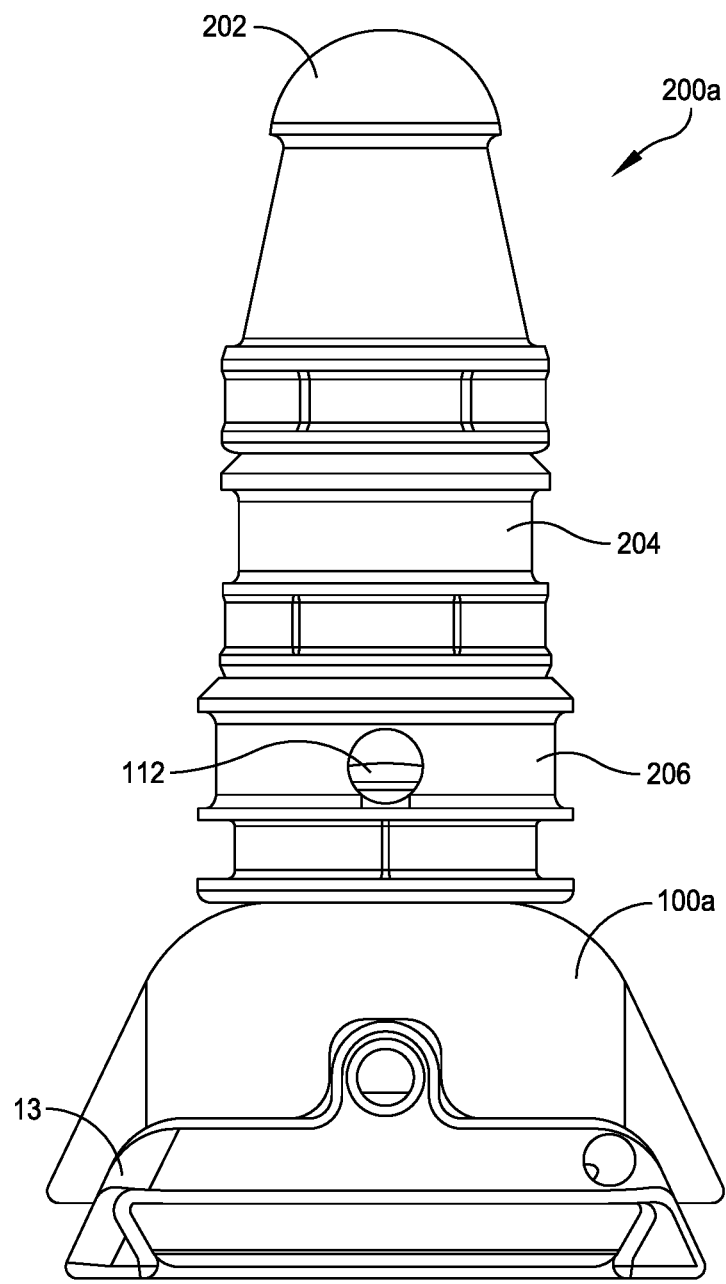
FIG. 12 illustrates a tibial portion of an example total ankle prosthesis having a tibia stem component.

Next referring to FIG. 3B, in step (b), a cavity 15 is formed into the distal end of the tibia 10 for receiving a bone interface feature such as a tibial stem component 200a (see FIG. 12). (Box 102). The cavity 15 formed in the tibia 10 has a proximal end 15a that is closed within the tibia and an opening 15b at the distal end of the tibia 10.

The cavity 15 can be formed using a 90° reamer tool that has an angled neck that is configured to drive a reamer bit that is oriented 90° with respect to the handle of the reamer tool. The 90° reamer tool can ream a hole into a bone in a direction that is orthogonal to the handle of the reamer tool. Such tool can be inserted into the ankle joint space 30, defined by the box cut shown in FIG. 3A, and ream the cavity 15 into the distal end of the tibia 10. To aid in reaming the cavity 15 in the desired location on the resected distal surface of the tibia, a 90° reaming alignment guide can be used. An example of such 90° reaming alignment guide 60 is shown in FIGS. 6A-6C.

The 90° reaming alignment guide 60 comprises a substantially flat body 64 and a reamer guide hole 62 provided in the flat body 64. The flat body has a top surface 64A that is intended to butt up against the resected distal surface of the tibia when aligning the guide hole 62 on the tibia. The guide hole 62 will guide the reamer bit of the 90° reamer tool for reaming the cavity 15. The alignment guide 60 further comprises a referencing tab 66 that extends orthogonal to the flat body 64 and helps align the position of the guide hole 62 with respect to the distal end of the tibia. The referencing tab 66 has a surface 66A that is orthogonal to the top surface 64A and forms a right angle corner with the top surface 64A as shown in FIG. 6C. The referencing tab 66 comprises an alignment platen 63 that is threadedly engaged in a threaded hole 67. In use, the flat body 64 of the guide is inserted into the ankle joint space 30 from anterior side and the top surface 64A of the alignment guide 60 is placed against the resected distal surface of the tibia with the alignment platen 63 contacting the anterior side of the distal end of the tibia. Then, the alignment of the guide hole 62 in the anterior-posterior direction with respect to the resected distal surface of the tibia can be adjusted by threading or unthreading the alignment platen 63. By unthreading the alignment platen 63 so that the platen 63 protrudes out of the threaded hole 67, the platen 63 will push against the anterior side of the distal end of the tibia and cause the rest of the guide 60 including the guide hole 62 to move in the anterior direction. By threading the alignment platen 63 into the threaded hole 67, the guide 60 including the guide hole 62 is moved in the posterior direction.

Figure 6E:
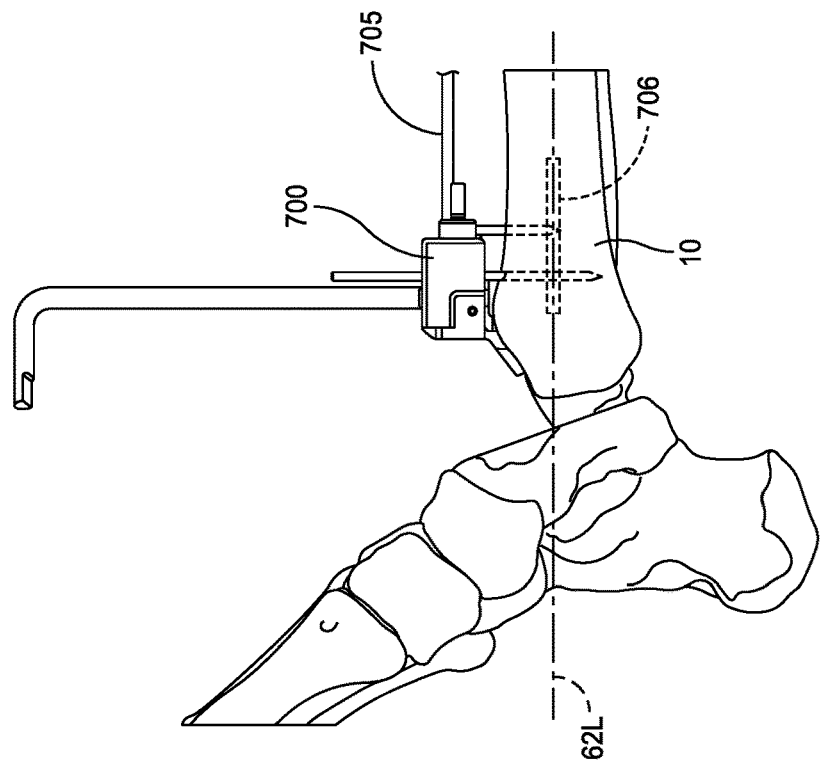
FIG. 6E is a medial view of the alignment jig of FIG. 6D
Figure 6D:
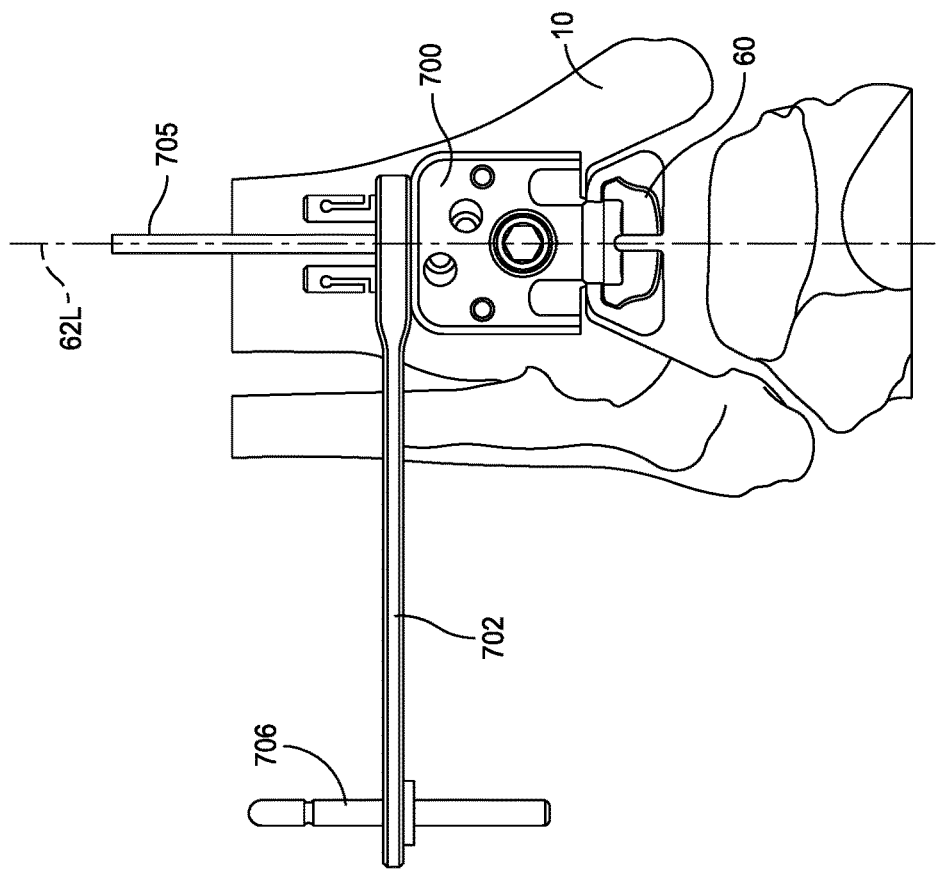
FIG. 6D is an anterior view of an alignment jig that can be used to align the guide of FIG. 6A.

Referring to FIGS. 6D and 6E, an alignment jig assembly, such as the example alignment jig assembly 700, can be used to assist in aligning the alignment guide 60 in a proper place to ream the cavity 15. FIG. 6D shows an anterior view of the alignment assembly 700 that is attached to the guide 60 and the combined assembly is secured to the distal end of the tibia 10 from the anterior side. The alignment assembly 700 comprises an Anterior-Posterior alignment rod 706 and a Medial-Lateral (i.e. coronal-sagittal) alignment rod 705.

As can be seen in the anterior view in FIG. 6D, the Anterior-Posterior alignment rod 706 is attached to the alignment assembly 700 by an alignment wing 702. The alignment assembly 700 is configured so that the Anterior-Posterior alignment rod 706 extends parallel to the longitudinal axis 62L of the guide hole 62 of the guide 60 so that the Anterior-Posterior alignment rod 706 can be used to align the longitudinal axis 62L with the tibia 10 in the Anterior-Posterior direction. The longitudinal axis 62L represents the direction of reaming that would be performed using the guide hole 62 as a guide for the 90° degree reamer tool discussed above. The alignment can be checked simply visually or with the aid of a fluoroscope. As can be seen in the medial view in FIG. 6E, when the Anterior-Posterior alignment rod 706 is aligned with the tibia 10, the longitudinal axis 62L of the guide hole 62 is also aligned with the tibia 10 in the Anterior-Posterior direction. Thus, while viewing from the medial or lateral side, the surgeon can check the Anterior-Posterior alignment of the guide hole 62 with respect to the tibia and adjust the position of the alignment guide 60 as necessary ensuring that the reaming through the guide hole 62 will advance into the tibia 10 in the direction desired by the surgeon.

Similarly, the alignment assembly 700 is configured so that the Medial-Lateral alignment rod 705 extends parallel to the longitudinal axis 62L of the guide hole 62 so that the Medial-Lateral alignment rod 705 can be used to align the longitudinal axis 62L with the tibial in the Medial-Lateral direction. As can be seen in the medial view in FIG. 6E, the Medial-Lateral alignment rod 705 extends from the aignment assembly 700 and is positioned above the tibia 10 on the anterior side of the tibia 10. The alignment in the Medial-Lateral direction can be checked simply visually or with the aid of a fluoroscope viewing from the anterior side as shown in FIG. 6D. When the Medial-Lateral alignment rod 705 is aligned with the tibia 10, the longitudinal axis 62L of the guide hole 62 is also aligned with the tibia 10 in the Medial-Lateral direction. Thus, while viewing from the anterior side as shown in FIG. 6D, the surgeon can check the Medial-Lateral alignment of the guide hole 62 with respect to the tibia 10 and adjust the position of the alignment guide 60 if necessary.

Referring to FIG. 6D, the Anterior-Posterior alignment rod 706 is positioned to the lateral side of the tibia 10. The Anterior-Posterior alignment rod 706 is also parallel to the longitudinal axis of the guide hole 62. When viewing under a fluoroscope from the medial side as shown in FIG. 6E, the Anterior-Posterior alignment rod 706 is visible through the tibia 10. Thus, the longitudinal axis of the guide hole 62 can be aligned to be in a desired position within the intramedullary canal of the tibia in the Anterior-Posterior direction under a fluoroscope. Thus, using the alignment assembly 700, the guide hole 62 in the 90° reamer alignment guide 60 is aligned in both the Medial-Lateral direction as well as the Anterior-Posterior direction.

Once the alignment guide 60 is positioned with the guide hole 62 in desired alignment, the alignment guide 60 can be secured in place, with appropriate pins for example, and a 90° reamer is used to ream the cavity 15 through the guide hole 62 of the alignment guide from the ankle joint space 30.

Next, in step (c), using the alignment assembly 700, the position of the stem reamer guide 70 is adjusted in Anterior-Posterior direction to align to flexible reamer's trajectory while centering in Medial-Lateral direction depending on the trajectory of the pilot cutting bit 51 drilling downward from the hole 17. (Box 103). This adjustment using the alignment assembly 700 can be performed under a fluoroscope.

Figure 5:
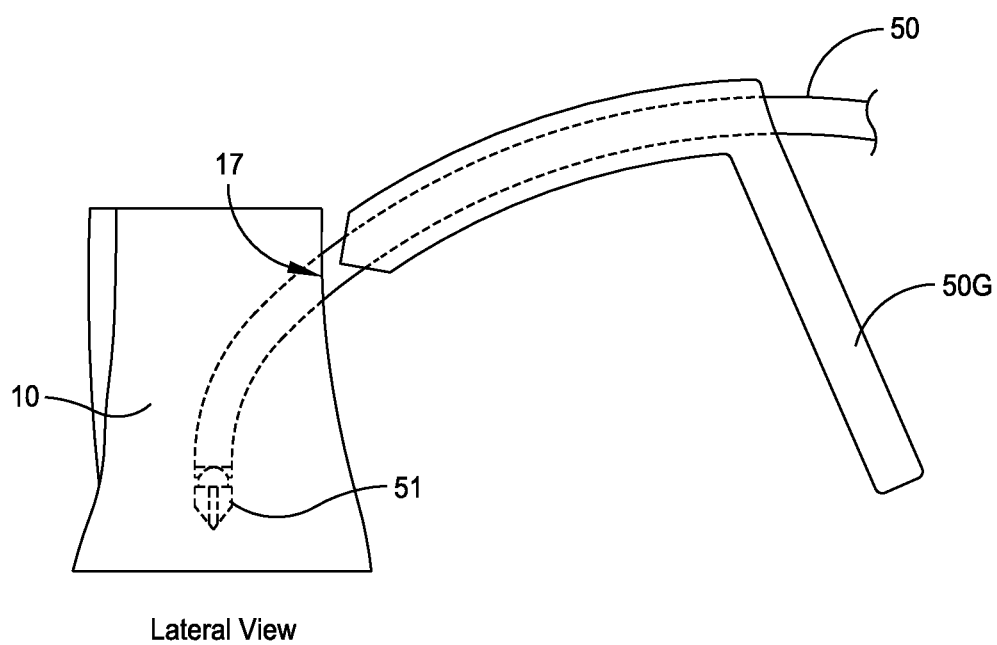
FIG. 5 illustrates lateral view of the step of drilling a hole in the tibia using a flexible reamer according to an aspect of the present disclosure.

Next, referring to FIG. 5, in step (d), a hole 17 is formed into the tibia 10 using a flexible reamer 50 fitted with a pilot cutting bit 51 from a location that is proximal with respect to the cavity 15 until the flexible reamer 50 exits into the cavity 15 at a location that is at the proximal end 15a of the cavity 15. (Box 104). FIG. 5 is a lateral view of a tibia 10 showing the arrangement where the hole 17 is drilled on the anterior side of the tibia 10. The hole 17 can be drilled in the anterior, medial, or posterior side of the tibia. The lateral side would not be feasible because of the fibula. In some embodiments, the preferred placement of the hole 17 is on the anterior side. Drilling of the hole 17 can be achieved with a cannulated drill guide 50G but it could be from straight to a curve drill guide or adjustable drill guide to control the path of the flexible reamer.

Figure 7A:
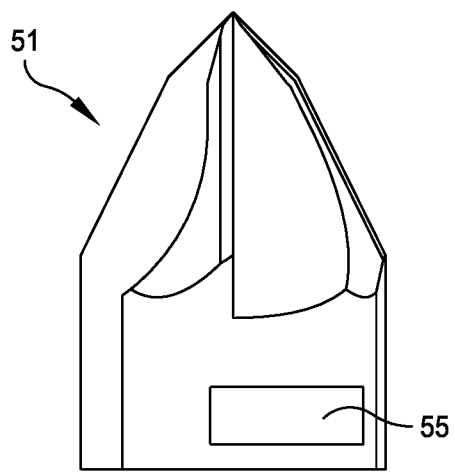
FIG. 7A is an illustration of a pilot cutting bit for a flexible reamer.
Figure 7B:
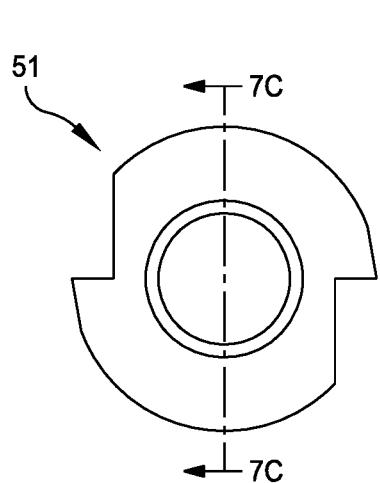
FIG. 7B is an illustration of a bottom view of the pilot cutting bit of FIG. 7A.
Figure 7C:
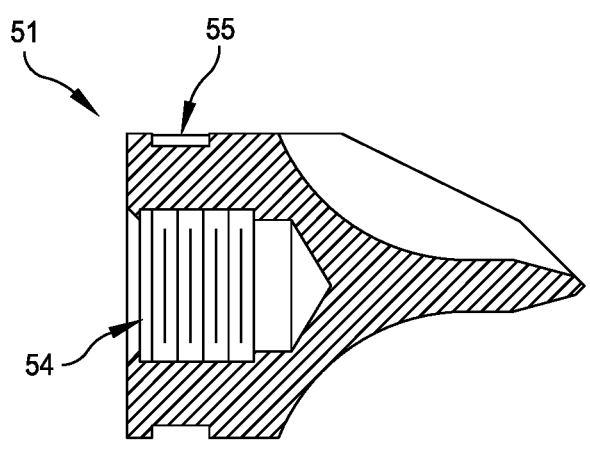
FIG. 7C is an illustration of a cross-sectional view of the pilot cutting bit of FIGS. 7A-7B taken through the section line 7C-7C shown in FIG. 7B.

The pilot cutting bit 51 can be any tool bit that is suitable for forming the hole 17 into the tibial 10. Some examples of such cutting bit are a standard reamer bit, a drill bit, a broach, etc. An example of a reamer bit as the pilot cutting bit 51 is illustrated in FIGS. 7A-7C. The pilot reamer bit 51 can comprise a threaded hole 54 for attaching to the flexible reamer 50.

Next, in step (e), the flexible reamer 50 is inserted further into the cavity 15 until the pilot cutting bit 51 is within the ankle joint space 30. (Box 105).

Figure 4:
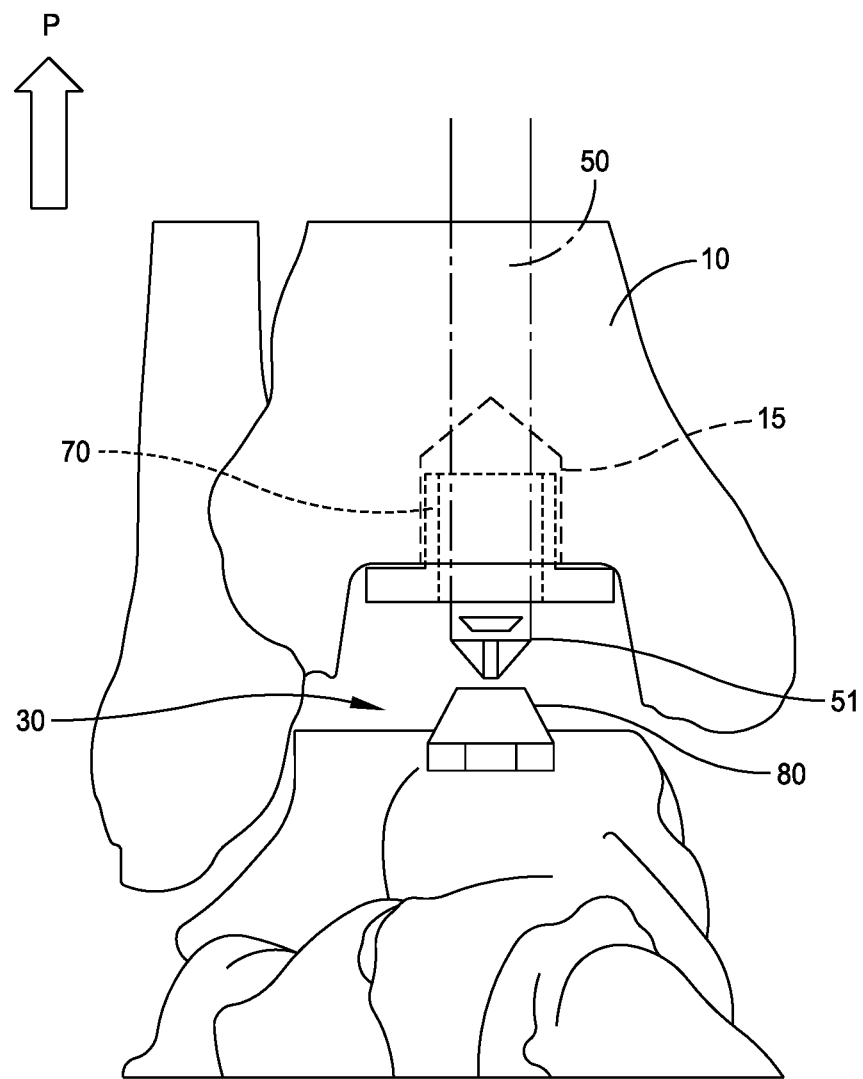
FIG. 4 illustrates the anterior view of the step of attaching a stem reamer bit to the head of the flexible reamer according to an aspect of the present disclosure.

Next, referring to FIG. 4, in step (f), a stem reamer guide 70 is slipped over the pilot cutting bit 51 and inserted into the cavity's opening 15b at the distal end of the tibia 10. (Box 106).

In some embodiments, the stem reamer guide 70 can be a bushing-like structure shown in FIGS. 8A-8C. The stem reamer guide 70 comprises a first portion 74 configured for inserting into the cavity's opening 15b and a second portion 75 that is configured for receiving a tool for assisting insertion into the cavity opening 15b. For example, the surface 74a of the first portion 74 can be tapered to form a press fit with the cavity opening's bone surface. In some embodiments, the first portion 74 can be configured with any other mechanism that will help keep the stem reamer guide 70 in place in the cavity's opening 15b. Some examples of such mechanism are leaf spring, tabs, straight/texture, grooves, etc. The second portion 75 extends outward radially as shown and can be configured with a groove 75G for receiving the tool for assisting the insertion into the cavity. The tool can be a wrench that fits into the groove in the second portion 75 to impact the stem reamer guide 70 into the cavity opening 15b. The stem reamer guide 70 also comprises a guide hole 72 extending there through for guiding a tibia stem reamer bit 80 disclosed herein, in the subsequent reaming procedure described herein. Multiple sizes of the stem reamer guide 70 can be provided in a surgical kit to accommodate different tibial stem implant sizes.

Figure 10A:
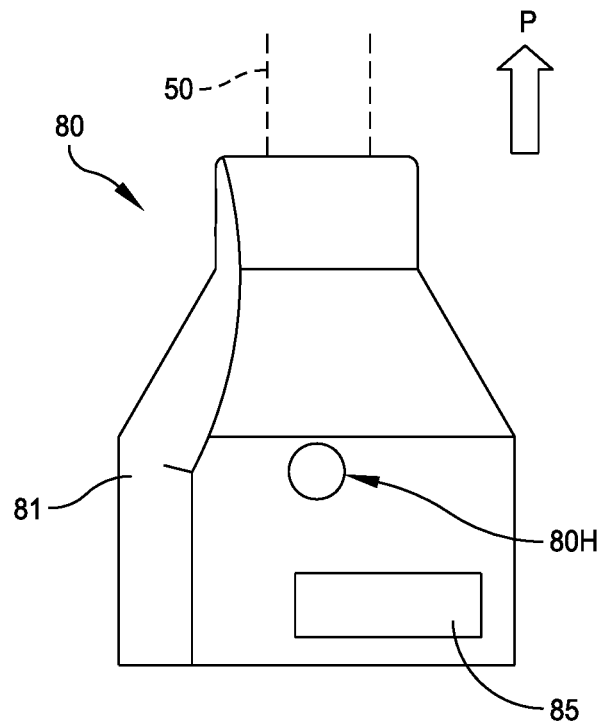
FIG. 10A is a side view illustration of a tibial stem reamer bit.
Figure 10B:
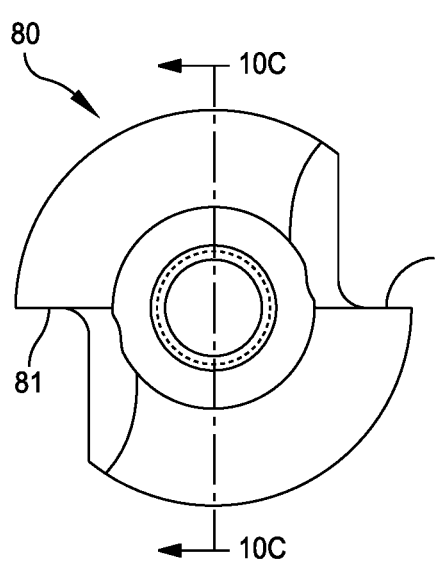
FIG. 10B is an end view illustration of the tibial stem reamer bit of FIG. 10A.
Figure 10C:
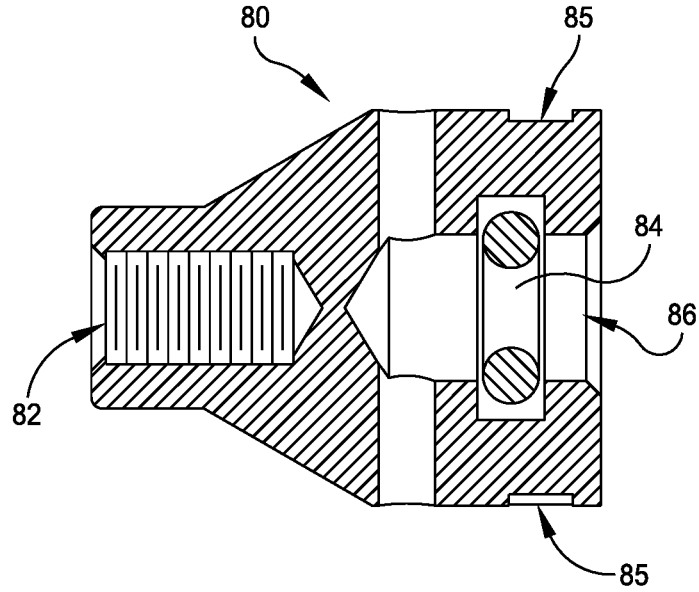
FIG. 10C is a cross-sectional view illustration of the tibial stem reamer bit, where the section is taken through the section line 10C-10C shown in FIG. 10B.

Next, in step (g), the pilot cutting bit 51 is replaced with a tibial reamer bit 80 (see FIGS. 10A-10C). (box 107). FIG. 10A shows the tibial reamer bit 80 attached to the end of the flexible reamer 50. The tibial reamer bit 80 is a reamer bit that is configured and adapted for reaming when pulled by the flexible reamer 50 in the proximal direction noted by the arrow P shown in FIG. 10A.

Next, in step (h), by pulling on the flexible reamer 50 and, thus, the tibial reamer bit 80 through the stem reamer guide 70 in the proximal direction P, the cavity 15 is extended in the proximal direction by reaming the intramedullary canal of the tibia. (Box 108).

Figure 2:
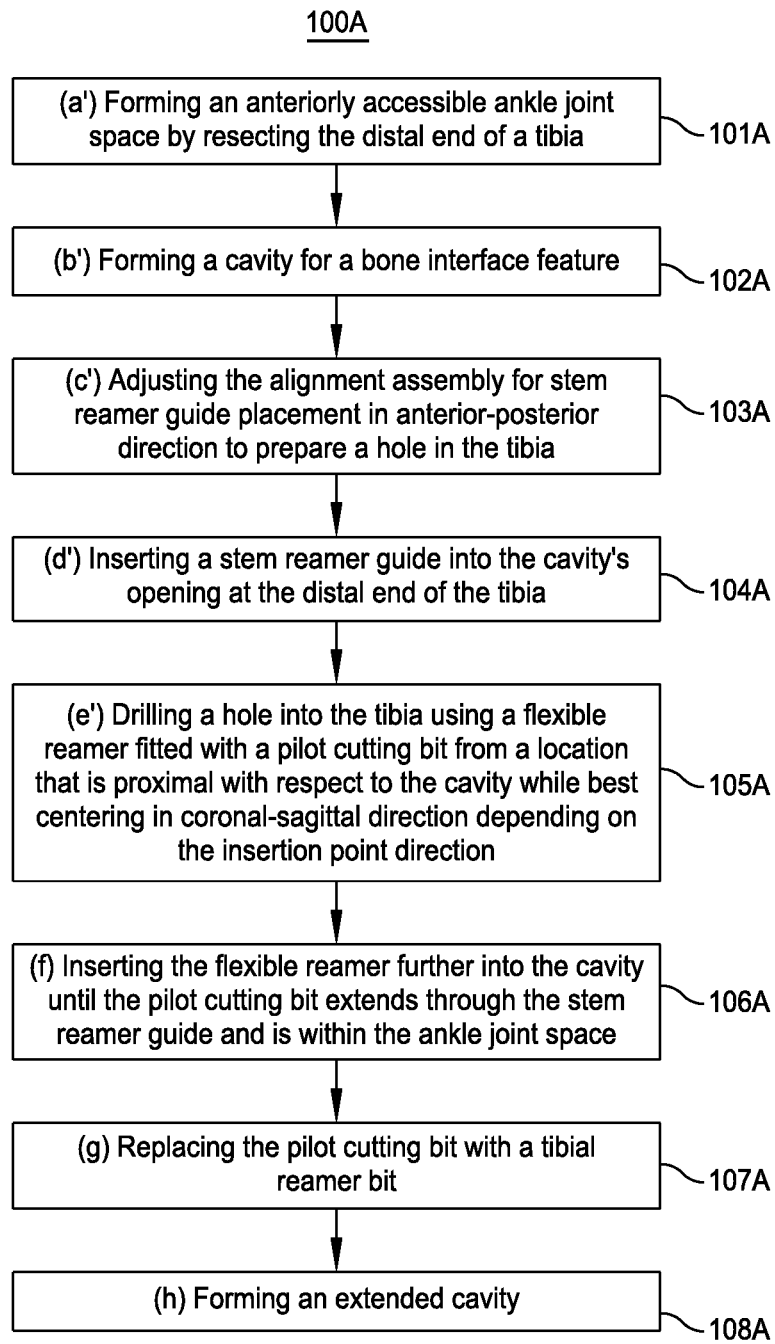
FIG. 2 is a flowchart representation of a method according to another embodiment of the present disclosure.

In some embodiments, the order of the steps (d)-(f) can be different. This alternate procedural steps are illustrated by flowchart 100A in FIG. 2. In this alternate example, the steps (a')-(c') illustrated in boxes 101A-103A are the same as steps (a)-(c) of flowchart 100. Then, (d') the flexible reamer 50 is inserted further into the cavity 15 until the pilot cutting bit 51 is within the ankle joint space. (Box 104A).

Next, in step (e'), a hole 17 is formed into the tibia 10 using the flexible reamer fitted with the pilot cutting bit 51 from a location that is proximal with respect to the cavity 15 until the flexible reamer 50 exits into the cavity 15 at a location that is at the proximal end 15a of the cavity 15. (Box 105A).

Next, in step (f'), the flexible reamer 50 is inserted further into the cavity 15 until the pilot cutting bit 51 extends through the guide hole 72 of the stem reamer guide 70 and into the ankle joint space 30. (Box 106A).

Then, the procedure is continued with the steps (g')-(h'), (boxes 107A-108A). that are the same as the steps (g)-(h) in flowchart 100.

The tibial reamer bit 80 comprises one or more cutting blades 81. As shown in the cross-sectional view in FIG. 10C, the leading end of the tibial reamer bit 80 can be provided with a threaded hole 82 for attaching to the flexible reamer 50. An example of a flexible reamer 50 is shown in FIGS. 9A-9B. The flexible reamer 50 comprises a tip 52 that is configured to be removably attached to a reamer bit such as the pilot cutting bit 51 and the tibial reamer bit 80. In one embodiment, the tip 52 is threaded to mate with the threaded hole 54 of the pilot cutting bit 51 or the threaded hole 82 of the second reamer bit 80. To facilitate threaded attaching and detaching of the reamer bits 51, 80 to the flexible reamer, the reamer bits are configured to be able to be turned with a tool such as a wrench or a plier. In the illustrated examples of the reamer bits 51 and 80, the reamer bits comprise flat surfaces 55, 85, respectively, so that a wrench can be used to assist in threading and unthreading the reamer bits onto the tip 52 of the flexible reamer 50. The flexible reamer 50, in turn, comprises similar feature, such as a hex flat-sided feature near the threaded tip 52 so that a wrench can be used to provide counter-torque when threading and unthreading the reamer bits onto the tip 52. The tibial reamer bit 80 can also comprise a hole 8011 for receiving a removal tool that can be used to detach the reamer bit 80 from the flexible reamer 50.

Once the tibial reamer bit 80 is attached to the end of the flexible reamer 50, in step (h), the proximal end of the cavity 15 is reamed by pulling the tibial reamer bit 80 through the guide hole 72 in the stem reamer guide 70 in the proximal direction P (see FIG. 10A) to form an extended cavity 15' (see FIG. 3B) by pulling the flexible reamer 50 in the proximal direction P. (Box 108).

The extended cavity 15' will be sized for receiving a tibial stem component. The flexible reamer 50 can be pulled in the proximal direction P as far as necessary. Generally, the diameter of the extended cavity 15' will be sized to match the size of the intended tibial stem component. The tibial reamer bit 80 can be provided in various diameter sizes to accomplish this.

Once the extended cavity 15' is reamed to a desired length, a bone interface feature can be inserted into the extended cavity 15'. An example of a bone interface feature is a tibia stem component 202 of an ankle replacement prosthesis. An example of such tibia stem component 202 is shown in FIG. 12. FIG. 12 illustrates one embodiment of a tibial portion 200a of a total ankle prosthesis having a tibial tray revision implant 100a coupled thereto. The tibial portion 200a includes a tibia stem 202 having one or more stem components 204, 206. The tibial revision implant 100a is coupled to the bottom stem component 206. For example, in some embodiments, the head 112 is inserted into a hole formed in a bottom surface of the tibia stem 202 (not shown).

Figure 11A:
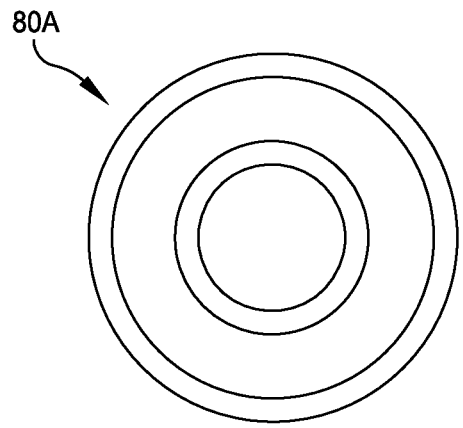
FIG. 11A is an end view illustration of a tibial reamer bit extender.
Figure 11B:
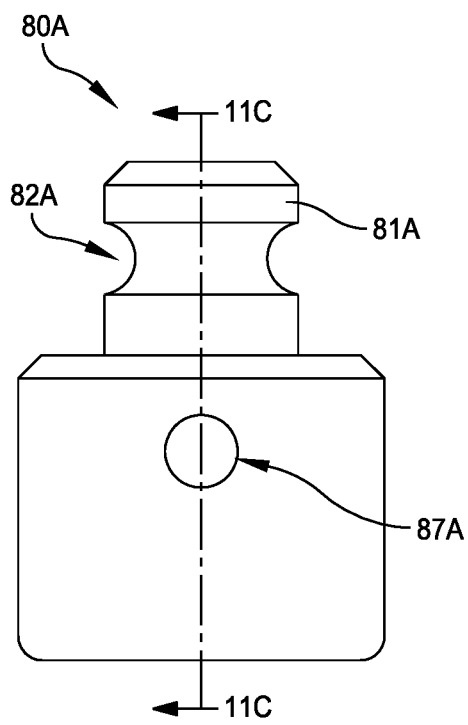
FIG. 11B is a side view illustration of the tibial reamer bit extender of FIG. 11A.

Referring to FIGS. 11A-11B, an extender 80A for tibial reamer bit 80 is disclosed. For example, if a tibial reamer bit 80 is 10 mm in length, and the extended cavity 15' to be reamed is to be 20 mm deep from the distal surface 73 of the stem reamer guide 70, an extender 80A that is at least 10 mm long would be snapped on to the tibial reamer bit 80. The extender 80A does not have any cutting blades because it is not necessary. The extender 80A serves to lengthen the distal end of the tibial reamer bit 80 so that as the tibial reamer bit 80 is pulled further into the tibia through the guide hole 72 in the stem reamer guide 70, the extender portion of the now extended reamer 80 will remain within the guide hole 72 and maintain the tibial reamer bit 80 in a proper attitude.

The extender 80A is attached to the tibial reamer bit 80 by inserting the leading end 81A of the extender 80A into the extension recess 86 in the tibial reamer bit 80. A snap ring 84 is provided inside the extension recess 86 to facilitate snap-fit engagement with the extender 80A. The leading end 81A of the extender 80A comprises an annular groove 82A for receiving the snap ring 84 when the leading end 81A is inserted into the extension recess 86. The extender is provided with its own extension recess 86A and a snap ring 84A situated within the extension recess 86A to receive and engage another extender 80A by a snap-fit engagement to further extend the tibial reamer bit 80 if necessary.

To remove the extender 80A from the tibial reamer bit 80, a removal rod or a pin is inserted through the hole 87 (see FIGS. 10A, 10C) provided in the body of the tibial reamer bit and push the extender 80A out. As can be seen in the cross-sectional view of the tibial reamer bit 80 in FIG. 10C, the hole 87 intersects the blind end of the extension recess 86. When the extender 80A is snap-fitted and fully seated in the extension recess 86, the leading end 81A of the extender is positioned within the intersection of the extension recess 86 and the hole 87. When the removal rod or a pin is inserted into the hole 87 and all the way through the reamer 80, along the way, the removal rod engages the chamfered edge 81C of the leading end 81A and urges the extender 80A out of the extension recess 86. The force is sufficient enough to overcome the holding spring force of the snap ring 84.

Figure 11C:
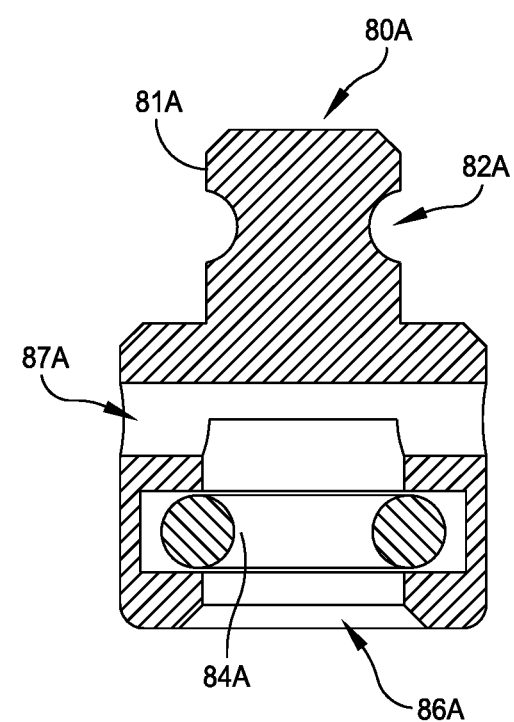
FIG. 11C is a cross-sectional view illustration of the tibial reamer bit extender, where the section is taken through the section line 11C-11C shown in FIG. 11B.

When two extenders 80A are snapped together, i.e., a trailing extender is snapped into the extension recess 86A of the leading extender, removing the trailing extender from the leading extender works the same way. A removing rod is inserted into the hole 87A (see FIGS. 11B, 11C) all the way through the leading extender 80A and the removing rod engages the chamfered edge 81C of the leading end 81A of the trailing extender and urge it out of the extension recess 86A of the leading extender.

In some embodiments, after the step (h), the disclosed method further comprises attaching a first tibial reamer bit extender 80A to a distal end of the tibial reamer bit 80 and continue reaming the extended cavity 15' by pulling the flexible reamer 50 in the proximal direction.

In some embodiments, the disclosed method can further comprise the step (i) of attaching a second tibial reamer bit extender 80A to a distal end of the first reaming guide extender 80A and continue reaming the proximal end of the cavity 15 by pulling the flexible reamer 50 in the proximal direction.

It will be understood that the foregoing description is of exemplary embodiments of this invention, and that the invention is not limited to the specific forms shown. Modifications may be made in the design and arrangement of the elements without departing from the scope of the invention.

We claim:

1. A method of ankle replacement, the method comprising:
    (a) forming an ankle joint space by resecting a distal end of a tibia;
    (b) forming a cavity for a bone interface feature into the distal end of the tibia, wherein the cavity has a proximal end that is closed within the tibia and an opening at the distal end of the tibia;
    (c) drilling a hole into the tibia using a flexible reamer fitted with a pilot cutting bit from a proximal tibia location until the flexible reamer exits into the cavity at a location that is at the proximal end of the cavity;
    (d) slipping a stem reamer guide over the pilot cutting bit and inserting the stem reamer guide into the cavity's opening at the distal end of the tibia;
    (e) replacing the pilot cutting bit with a tibial reamer bit that is configured for reaming in a proximal direction; and
    (f) forming an extended cavity by pulling the tibial reamer bit through the stem reamer guide in the proximal direction and reaming the proximal end of the cavity by pulling the flexible reamer in the proximal direction.

2. The method of claim 1, wherein the ankle joint space is anteriorly accessible.

3. The method of claim 1, wherein the step (a) further comprises resecting a superior portion of the talus associated with the tibia to provide more space in the ankle joint space.

4. The method of claim 1, further comprising:
    (g) attaching a first reaming guide extender to a distal end of the tibial reamer bit; and
    (h) continuing reaming the proximal end of the cavity further by pulling the flexible reamer in the proximal direction.

5. The method of claim 4, further comprising:
    attaching a second reaming guide extender to a distal end of the first reaming guide extender; and
    continuing reaming the proximal end of the cavity further by pulling the flexible reamer in the proximal direction.

6. The method of claim 1, wherein forming the cavity into the distal end of the tibia comprises using an angled neck reamer.

7. The method of claim 6, wherein a neck of the angled neck reamer has an angle between 0°-180°.

8. A method of ankle replacement, the method comprising:
    (a') forming an ankle joint space by resecting the distal end of a tibia;
    (b') forming a cavity for a bone interface feature into the distal end of the tibia, wherein the cavity has a proximal end that is closed within the tibia and an opening at the distal end of the tibia;
    (c') inserting a stem reamer guide into the cavity's opening at the distal end of the tibia;
    (d') drilling a hole into the tibia using a flexible reamer fitted with a pilot cutting bit from a proximal tibia location;
    (e') replacing the pilot cutting bit with a tibial reamer bit that is configured for reaming in a proximal direction; and
    (f') forming an extended cavity by pulling the tibial reamer bit through the stem reamer guide in the proximal direction and reaming the proximal end of the cavity by pulling the flexible reamer in the proximal direction.

9. The method of claim 8, wherein the ankle joint space is anteriorly accessible.

10. The method of claim 8, wherein the step (a) further comprises resecting a superior portion of the talus associated with the tibia to provide more space in the ankle joint space.

11. The method of claim 8, further comprising:
    (g) attaching a first reaming guide extender to a distal end of the tibial reamer bit; and
    (h) continuing reaming the proximal end of the cavity further by pulling the flexible reamer in the proximal direction.

12. The method of claim 11, further comprising:
    attaching a second reaming guide extender to a distal end of the first reaming guide extender; and
    continuing reaming the proximal end of the cavity further by pulling the flexible reamer in the proximal direction.

13. The method of claim 8, wherein forming the cavity into the distal end of the tibia comprises using an angled neck reamer.

14. The method of claim 13, wherein a neck of the angled neck reamer has an angle between 0°-180°.

* * * * *